United States Patent
Saito

(10) Patent No.: US 10,519,376 B2
(45) Date of Patent: *Dec. 31, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/823,587

(22) Filed: Nov. 28, 2017

(65) Prior Publication Data

US 2018/0148649 A1 May 31, 2018

(30) Foreign Application Priority Data

Nov. 29, 2016 (JP) .................................. 2016-231098

(51) Int. Cl.
| | |
|---|---|
| *G02F 1/13* | (2006.01) |
| *C09K 19/44* | (2006.01) |
| *C09K 19/46* | (2006.01) |
| *C09K 19/54* | (2006.01) |
| *C09K 19/30* | (2006.01) |
| *C09K 19/20* | (2006.01) |
| *C09K 19/02* | (2006.01) |
| *C09K 19/34* | (2006.01) |
| *C09K 19/12* | (2006.01) |

(52) U.S. Cl.
CPC .......... *C09K 19/44* (2013.01); *C09K 19/0208* (2013.01); *C09K 19/0216* (2013.01); *C09K 19/2007* (2013.01); *C09K 19/3068* (2013.01); *C09K 19/46* (2013.01); *C09K 19/54* (2013.01); *C09K 2019/122* (2013.01); *C09K 2019/123* (2013.01); *C09K 2019/2035* (2013.01); *C09K 2019/3016* (2013.01); *C09K 2019/3075* (2013.01); *C09K 2019/3422* (2013.01)

(58) Field of Classification Search
CPC ....................................................... C09K 19/30
See application file for complete search history.

(56) References Cited

U.S. PATENT DOCUMENTS

2018/0127651 A1* 5/2018 Saito ..................... G02F 1/1362

FOREIGN PATENT DOCUMENTS

JP  2014-025025  2/2014

\* cited by examiner

*Primary Examiner* — Chanceity N Robinson
(74) *Attorney, Agent, or Firm* — JCIPRNET

(57) ABSTRACT

A liquid crystal composition satisfies at least one of characteristics such as high maximum temperature, low minimum temperature, small viscosity, suitable optical anisotropy, large dielectric anisotropy and high stability to ultraviolet light, or having a suitable balance regarding at least two of the characteristics. The liquid crystal composition contains a quencher as an additive, and may contain a specific compound having large positive dielectric anisotropy as a first component, a specific compound having high maximum temperature or small viscosity as a second component, or a specific compound having large negative dielectric anisotropy as a third component.

14 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefit of Japanese application serial no. 2016-231098, filed on Nov. 29, 2016. The entirety of the above-mentioned patent application is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having positive dielectric anisotropy, and an active matrix (AM) device that includes the composition and has a mode such as a TN mode, an ECB mode, an OCB mode, an IPS mode, an FFS mode or an FPA mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in the characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, small viscosity in the composition is preferred. Small viscosity at low temperature is further preferred. An elastic constant of the composition relates to a contrast of the device. In order to increase the contrast of the device, a large elastic constant in the composition is further preferred.

TABLE 1

Characteristics of composition and AM device

| No. | Characteristics of composition | Characteristics of AM device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

Optical anisotropy of the composition relates to a contrast ratio in the device. According to a mode of the device, large optical anisotropy or small optical anisotropy, more specifically, suitable optical anisotropy is required. A product ($\Delta n \times d$) of the optical anisotropy ($\Delta n$) of the composition and a cell gap (d) in the device is designed so as to maximize the contrast ratio. A suitable value of the product depends on a type of the operating mode. In a device having a mode such as TN, a suitable value is about 0.45 micrometer. In the above case, a composition having the large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having large specific resistance at room temperature and also at a temperature close to the maximum temperature of the nematic phase in an initial stage is preferred. The composition having large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device use in a liquid crystal monitor, a liquid crystal television and so forth.

In a polymer sustained alignment (PSA) mode liquid crystal display device, a liquid crystal composition containing a polymer is used. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. A composition having the positive or negative dielectric anisotropy is used in an AM device having the IPS mode or the FFS mode. A composition having the positive or negative dielectric anisotropy is used in an AM device having the polymer sustained alignment (PSA) mode. The liquid crystal composition containing a quencher related to the invention is disclosed in Patent literature No. 1 described below.

CITATION LIST

Patent Literature

Patent literature No. 1: JP 2014-025025 A.

SUMMARY OF INVENTION

The invention provides a liquid crystal composition satisfying at least one of characteristics such as high maximum temperature of a nematic phase, low minimum temperature of the nematic phase, small viscosity, suitable optical anisotropy, large dielectric anisotropy, large specific resistance, high stability to ultraviolet light, high stability to heat and a large elastic constant. The invention further provides a liquid crystal composition having a suitable balance regarding at least two of the characteristics. The invention further provides a liquid crystal display device including such a composition. The invention further provides an AM device having characteristics such as a short response time, a large voltage holding ratio, low threshold voltage, a large contrast ratio and a long service life.

The invention concerns a liquid crystal composition that contains a compound represented by formula (1) as an additive, and has a nematic phase and positive dielectric anisotropy, and a liquid crystal display device including the composition.

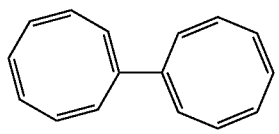
(1)

DESCRIPTION OF EMBODIMENTS

The invention provides a liquid crystal composition satisfying at least one of characteristics such as high maximum temperature of a nematic phase, low minimum temperature of the nematic phase, small viscosity, suitable optical anisotropy, large dielectric anisotropy, large specific resistance, high stability to ultraviolet light, high stability to heat and a large elastic constant. The invention further provides the liquid crystal composition having a suitable balance regarding at least two of the characteristics. The invention further provides a liquid crystal display device including such a composition. The invention further provides an AM device having characteristics such as a short response time, a large voltage holding ratio, a low threshold voltage, a large contrast ratio and a long service life.

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but being mixed with the composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "Polymerizable compound" includes a compound to be added to the composition for the purpose of forming a polymer in the composition. A liquid crystal compound having alkenyl is not polymerizable in the above meaning.

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added when necessary. A proportion of the liquid crystal compound is expressed in terms of weight percent (% by weight) based on the weight of the liquid crystal composition containing no additive, even after the additive has been added. Proportion of the additive is expressed in terms of weight percent (% by weight) based on the weight of the liquid crystal composition containing no additive. More specifically, the proportion of the liquid crystal compound and the additive is calculated based on the total weight of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance in an initial stage, and the composition has the large specific resistance even after the device has been used for a long period of time. An expression "having a large voltage holding ratio" means that the device has a large voltage holding ratio at room temperature and also at a temperature close to the maximum temperature in the initial stage, and the device has the large voltage holding ratio at room temperature and also at a temperature close to the maximum temperature even after the device has been used for the long period of time. The characteristics of the composition and the device may be occasionally examined by an aging test. An expression "increase the dielectric anisotropy" means that a value of dielectric anisotropy positively increases in a liquid crystal composition having positive dielectric anisotropy, and the value of dielectric anisotropy negatively increases in a liquid crystal composition having negative dielectric anisotropy.

An expression "at least one piece of —$CH_2$— may be replaced by —O—" is used herein. In the above case, —$CH_2$—$CH_2$—$CH_2$— may be converted into —O—$CH_2$—O— by replacing pieces of —$CH_2$— that are not adjacent to each other by —O—. However, pieces of —$CH_2$— that are adjacent to each other never be replaced by —O—. The reason is that —O—O—$CH_2$— (peroxide) is formed in the replacement. More specifically, the above expression means both "one piece of —$CH_2$— may be replaced by —O—" and "at least two pieces of —$CH_2$— that are not adjacent to each other may be replaced by —O—." A same rule applies to replacement to —O—, and also to replacement to a divalent group such as —CH=CH— or —COO—.

A symbol of terminal group $R^1$ is used for a plurality of compounds in chemical formulas of component compounds.

In the compounds, two of groups represented by any two pieces of $R^1$ may be identical or different. In one case, for example, $R^1$ of compound (2-1) is ethyl and $R^1$ of compound (2-2) is ethyl. In another case, $R^1$ of compound (2-1) is ethyl and $R^1$ of compound (2-2) is propyl. A same rule applies also to a symbol such as any other terminal groups. In formula (2), when a subscript 'a' is 2, two of rings A exist. In the compound, two of rings represented by two of rings A may be identical or different. A same rule applies also to any two of rings A when the subscript 'a' is larger than 2. A same rule applies also to symbols such as $Z^1$ and ring B.

Then, 2-fluoro-1,4-phenylene means two divalent groups described below. In a chemical formula thereof, fluorine may be leftward (L) or rightward (R). A same rule applies also to an asymmetrical divalent group formed by removing two hydrogen from a ring, such as tetrahydropyran-2,5-diyl. A same rule applies also to a divalent bonding group such as carbonyloxy (—COO— or —OCO—).

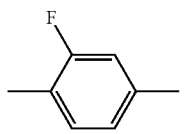
(L)

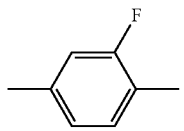
(R)

Alkyl of the liquid crystal composition is straight-chain alkyl or branched-chain alkyl, and includes no cyclic alkyl. Straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature.

The invention includes items described below.

Item 1. A liquid crystal composition that contains a compound represented by formula (1) as an additive, and has a nematic phase and positive dielectric anisotropy:

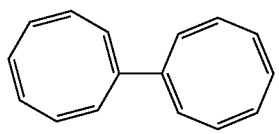
(1)

Item 2. The liquid crystal composition according to item 1, wherein a proportion of the additive is in the range from 0.005% by weight to 2% by weight.

Item 3. The liquid crystal composition according to item 1 or 2, containing at least one compound selected from the group of compounds represented by formula (2) as a first component:

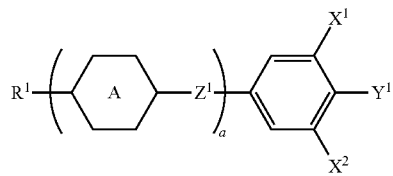
(2)

wherein, in formula (2), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; and a is 1, 2, 3 or 4.

Item 4. The liquid crystal composition according to any one of items 1 to 3, containing at least one compound selected from the group of compounds represented by formula (2-1) to formula (2-35) as the first component:

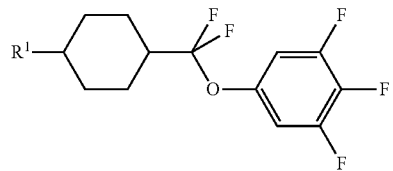
(2-1)

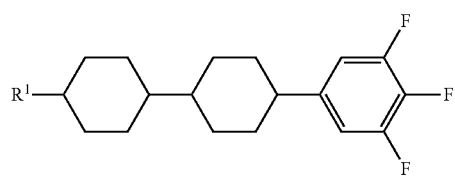
(2-2)

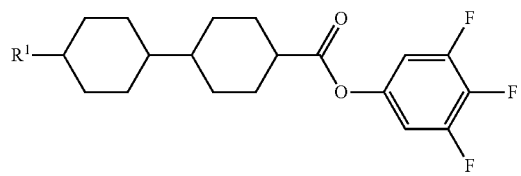
(2-3)

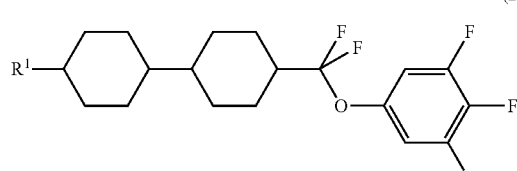
(2-4)

(2-5)
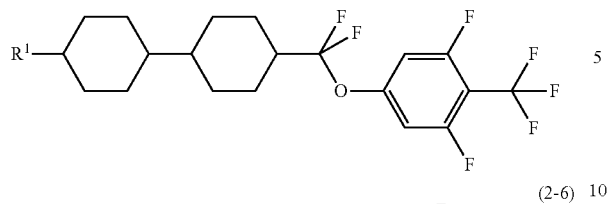
(2-6)
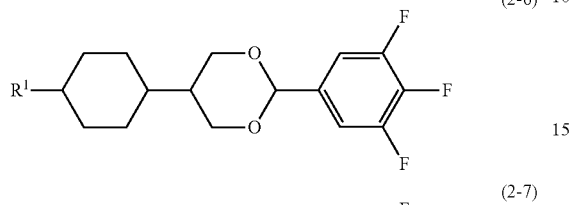
(2-7)
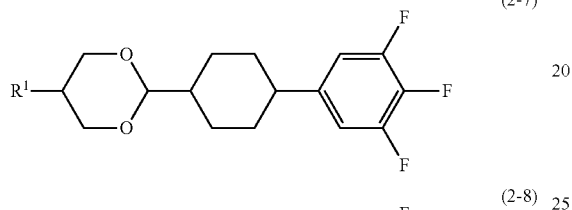
(2-8)
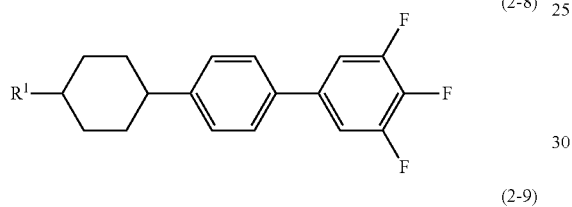
(2-9)
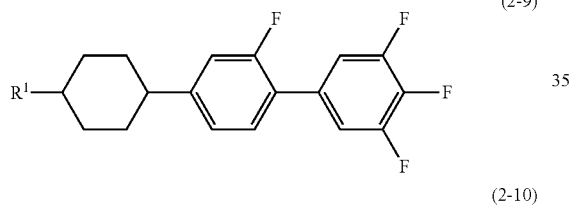
(2-10)
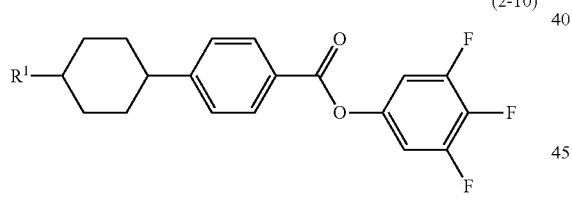
(2-11)
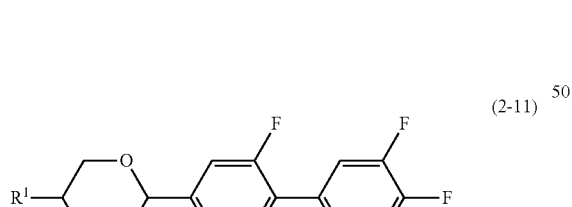
(2-12)
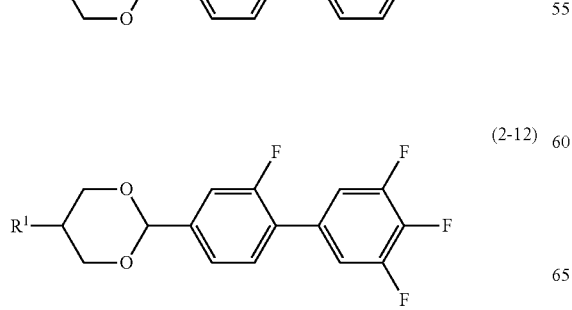
(2-13)
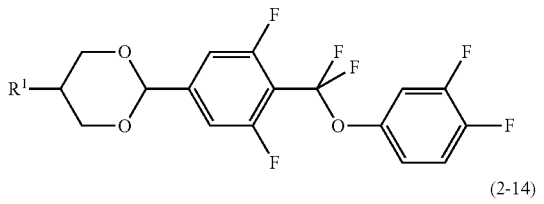
(2-14)
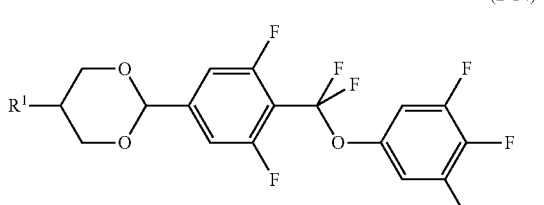
(2-15)
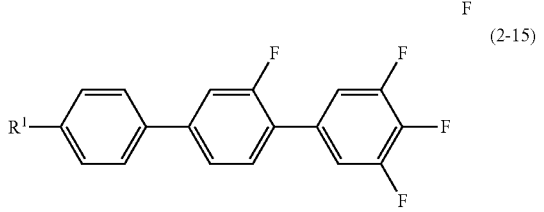
(2-16)
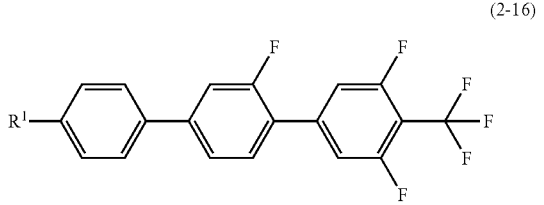
(2-17)
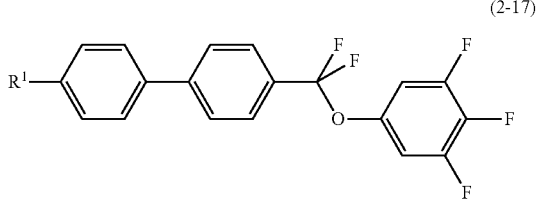
(2-18)
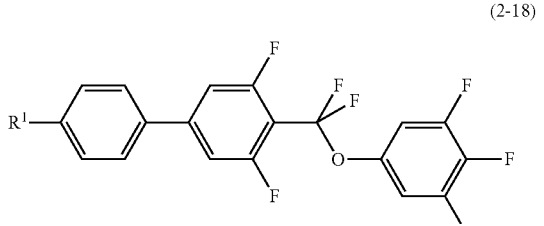
(2-19)
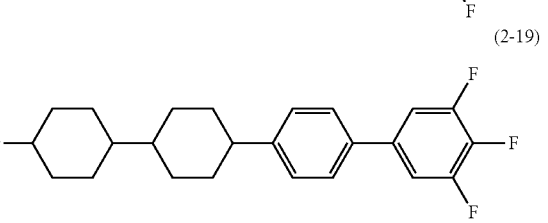
(2-20)
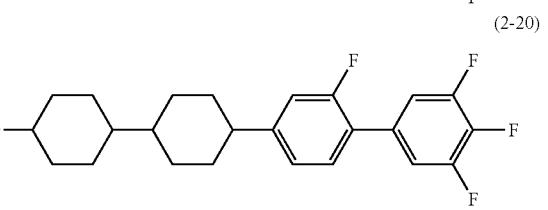

-continued
(2-21)
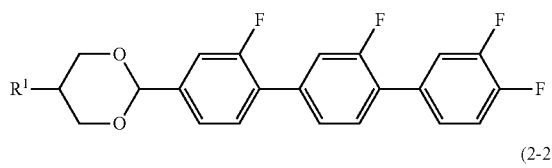
(2-22)
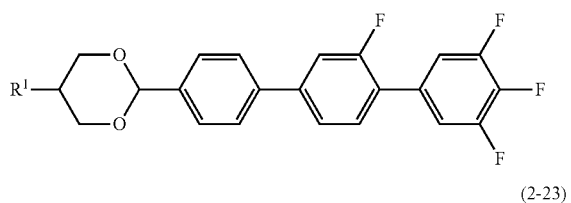
(2-23)
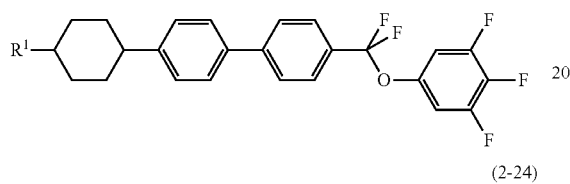
(2-24)
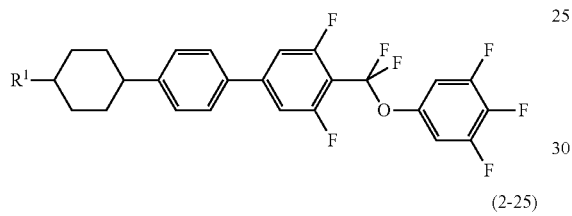
(2-25)
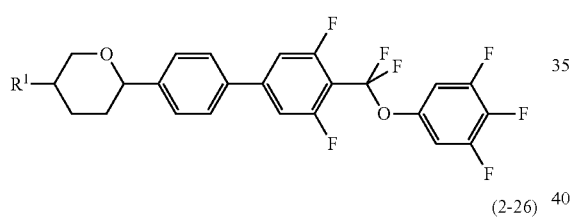
(2-26)
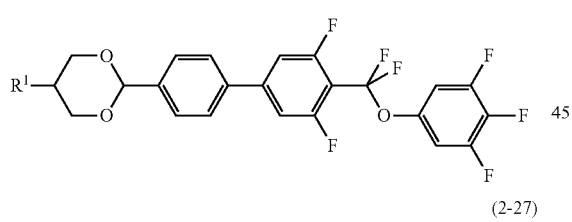
(2-27)
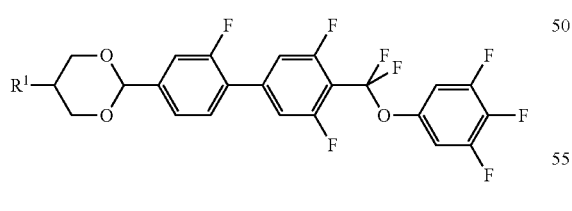
(2-28)
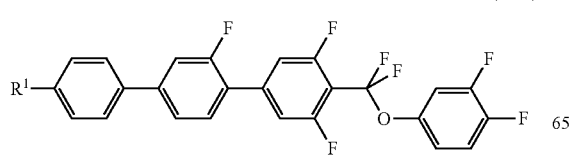
-continued
(2-29)
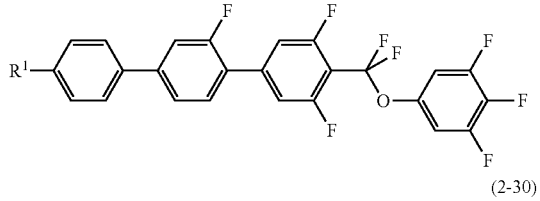
(2-30)
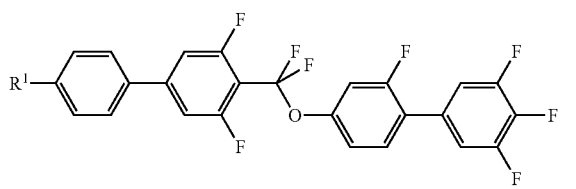
(2-31)
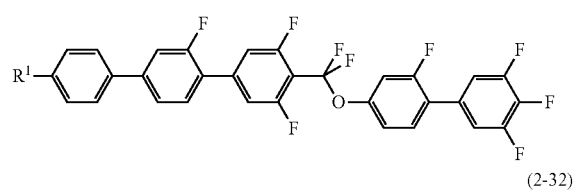
(2-32)
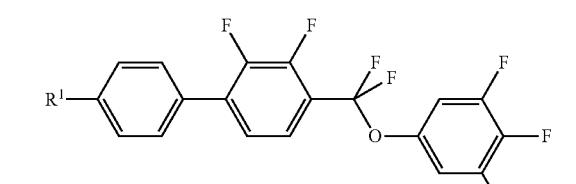
(2-33)
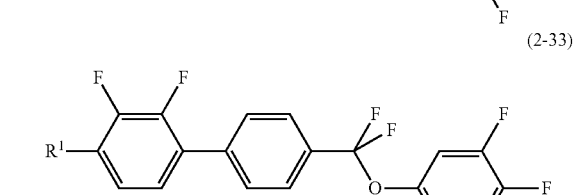
(2-34)
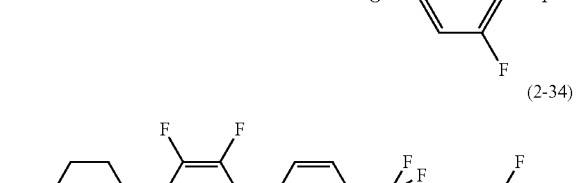
(2-35)
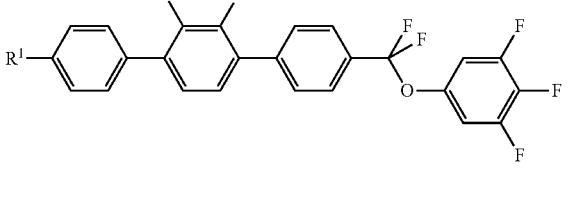
wherein, in formula (2-1) to formula (2-35), $R^1$ is alkyl having 1 to 12 carbons, alkoxy having 1 to 12 carbons or alkenyl having 2 to 12 carbons.
Item 5. The liquid crystal composition according to item 3 or 4, wherein a proportion of the first component is in the range from 10% by weight to 85% by weight based on the weight of the liquid crystal composition.

Item 6. The liquid crystal composition according to anyone of items 1 to 5, containing at least one compound selected from the group of compounds represented by formula (3) as a second component:

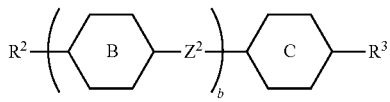
(3)

wherein, in formula (3), $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

Item 7. The liquid crystal composition according to any one of items 1 to 6, containing at least one compound selected from the group of compounds represented by formula (3-1) to formula (3-13) as the second component:

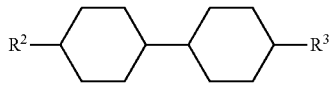
(3-1)

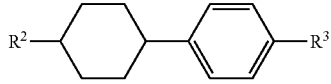
(3-2)

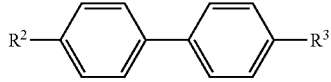
(3-3)

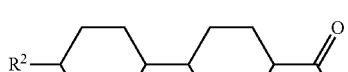
(3-4)

(3-5)

(3-6)

(3-7)

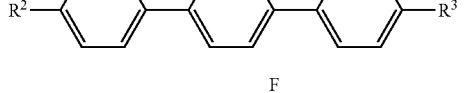
(3-8)

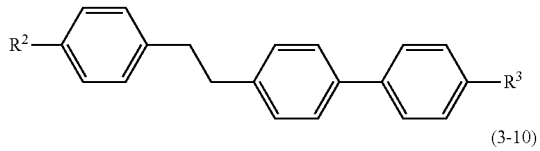
(3-9)

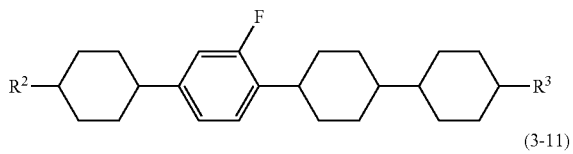
(3-10)

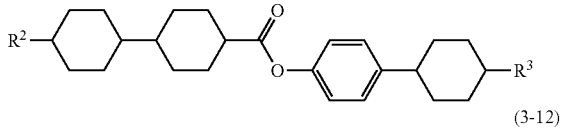
(3-11)

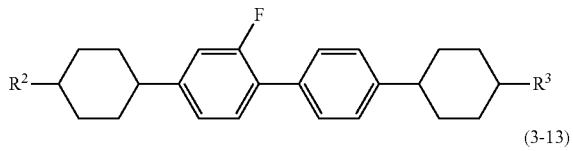
(3-12)

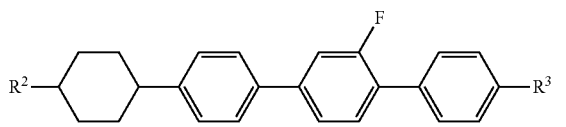
(3-13)

wherein, in formula (3-1) to formula (3-13), $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine.

Item 8. The liquid crystal composition according to item 6 or 7, wherein a proportion of the second component is in the range from 10% by weight to 85% by weight based on the weight of the liquid crystal composition.

Item 9. The liquid crystal composition according to any one of items 1 to 8, containing at least one compound selected from the group of compounds represented by formula (4) as a third component:

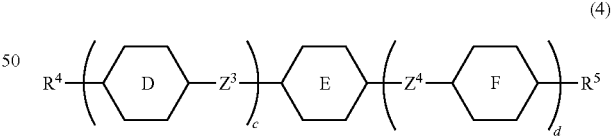
(4)

wherein, in formula (4), $R^4$ and $R^5$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3 and d is 0 or 1; and a sum of c and d is 3 or less.
Item 10. The liquid crystal composition according to any one of items 1 to 9, containing at least one compound selected from the group of compounds represented by formula (4-1) to formula (4-22) as the third component:
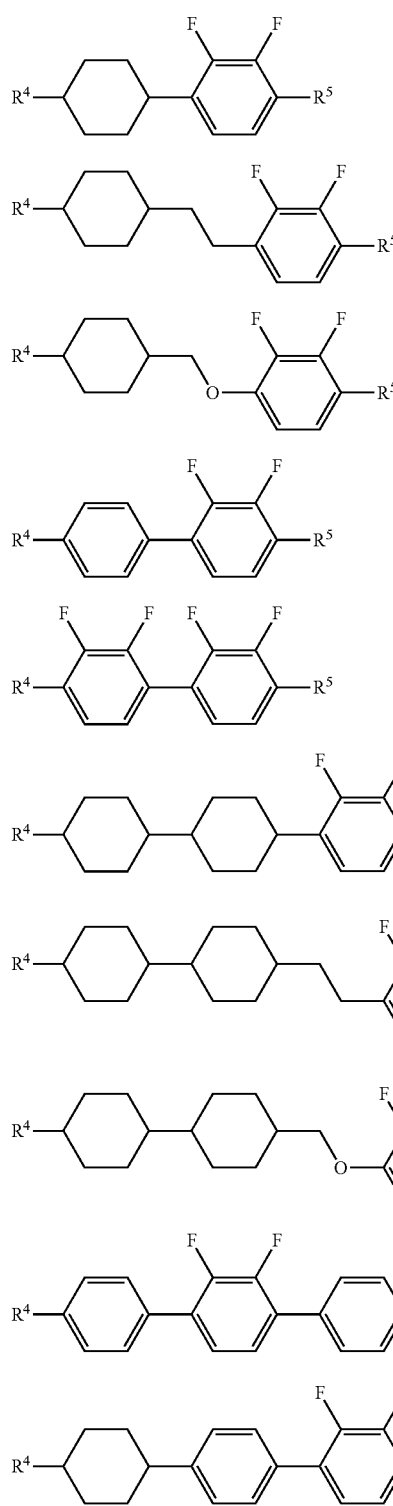
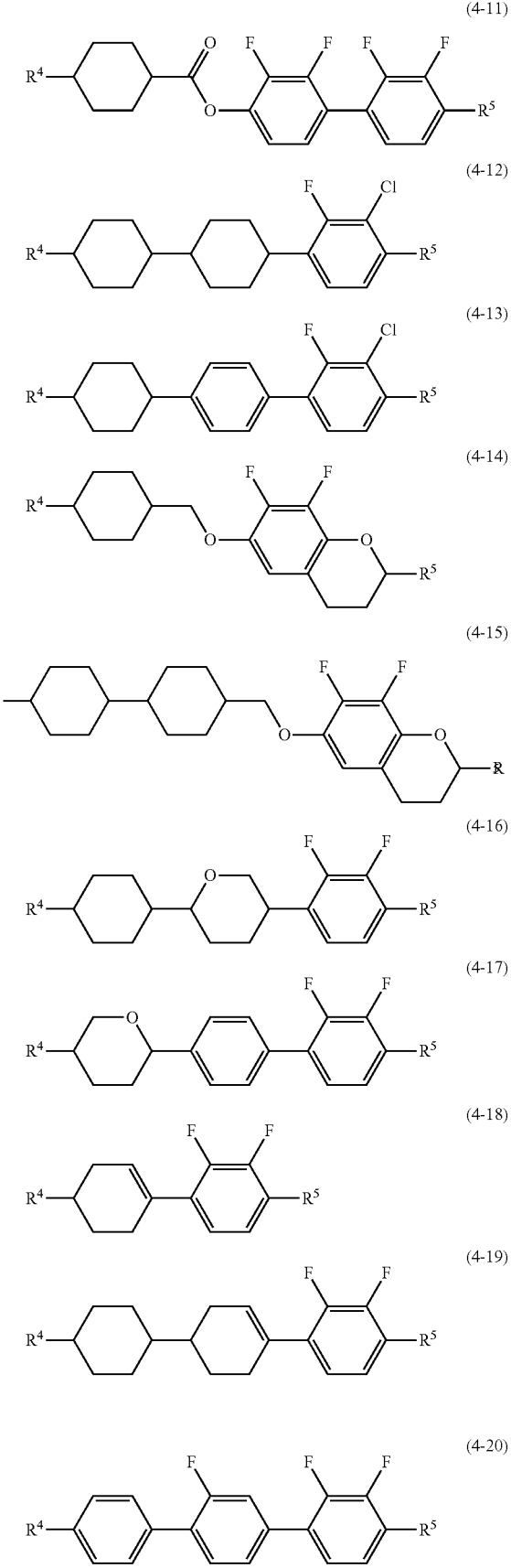

(4-21)

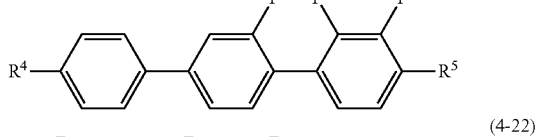

(4-22)

wherein, in formula (4-1) to formula (4-22), $R^4$ and $R^5$ are independently alkyl having 1 to 12 carbons, alkoxy having 1 to 12 carbons, alkenyl having 2 to 12 carbons or alkenyloxy having 2 to 12 carbons.

Item 11. The liquid crystal composition according to item 9 or 10, wherein a proportion of the third component is in the range from 3% by weight to 25% by weight based on the weight of the liquid crystal composition.

Item 12. The liquid crystal composition according to any one of items 1 to 11, wherein a maximum temperature of a nematic phase is 70° C. or higher, an optical anisotropy (measured at 25° C.) at a wavelength of 589 nanometers is 0.07 or more, and a dielectric anisotropy (measured at 25° C.) at a frequency of 1 kHz is 2 or more.

Item 13. A liquid crystal display device including the liquid crystal composition according to any one of items 1 to 12.

Item 14. The liquid crystal display device according to item 13, wherein an operating mode in the liquid crystal display device is a TN mode, an ECB mode, an OCB mode, an IPS mode, an FFS mode or an FPA mode, and a driving mode in the liquid crystal display device is an active matrix mode.

Item 15. Use of the liquid crystal composition according to any one of items 1 to 12 in a liquid crystal display device.

The invention further includes the following items: (a) the composition containing one compound, two compounds, or three or more compounds selected from the group of additives such as an optically active compound, an antioxidant, an ultraviolet light absorber, a dye, an antifoaming agent, a polymerizable compound, a polymerization initiator and a polymerization inhibitor; (b) an AM device including the composition; (c) a polymer sustained alignment (PSA) mode AM device including the composition, further containing a polymerizable compound; (d) the polymer sustained alignment (PSA) mode AM device, wherein the device includes the composition, and the polymerizable compound in the composition is polymerized; (e) a device including the composition, and having a PC, TN, STN, ECB, OCB, IPS, VA, FFS or FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compounds will be described. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to the liquid crystal compound selected from compound (2), compound (3) and compound (4). An expression "any other liquid crystal compound" means a liquid crystal compound different from compound (2), compound (3) and compound (4). Such a compound is mixed with the composition for the purpose of further adjusting the characteristics. The additive is the optically active compound, the antioxidant, the ultraviolet light absorber, the dye, the antifoaming agent, the polymerizable compound, the polymerization initiator, the polymerization inhibitor or the like. A quencher is also classified into the additive.

Composition B consists essentially of liquid crystal compounds selected from compound (2), compound (3) and compound (4). An expression "essentially" means that the composition may contain the additive, but contains no any other liquid crystal compound. Examples of composition B include a composition containing compound (2), compound (3) and compound (4) as an essential component. Composition B has a smaller number of components than composition A has. Composition B is preferred to composition A from a viewpoint of cost reduction. Composition A is preferred to composition B from a viewpoint of ability of further adjusting the characteristics by mixing any other liquid crystal compound.

Second, the main characteristics of the component compounds and the main effects of the compounds on the composition and the device will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and 0 (zero) means that a value is significantly small.

TABLE 2

| Characteristic of compounds | | | |
|---|---|---|---|
| Compounds | Compound (2) | Compound (3) | Compound (4) |
| Maximum temperature | S to L | S to M | S to M |
| Viscosity | M to L | S to M | L |
| Optical anisotropy | S to L | S to L | M to L |
| Dielectric anisotropy | M to L | 0 | L[1)] |
| Specific resistance | L | L | L |

[1)]A value of dielectric anisotropy is negative, and the symbol shows magnitude of an absolute value.

The main effects of the component compounds are as described below. Compound (1) serves as a quencher, and contributes to the high stability to heat or ultraviolet light. Compound (1) is very small in adding amount, and therefore, in many cases, does not affect the characteristics such as the maximum temperature, the optical anisotropy and the dielectric anisotropy. Compound (2) increases the dielectric anisotropy. Compound (3) decreases the viscosity or increases the maximum temperature. Compound (4) increase the dielectric constant in a minor axis direction.

The quencher is a substance that returns a molecule from an excited state to a ground state. The molecule absorbs light to be excited. The molecule emits light when returned from the exited state to the ground state. A substance that receives energy from the excited molecule is referred to as the quencher. The quencher absorbs ultraviolet light, but the ability is small in comparison with the ultraviolet light absorber. A difference between the quencher and the ultraviolet light absorber is as described below. The ultraviolet light absorber is a compound that absorbs ultraviolet light preferentially in comparison with a substance desired to be protected from ultraviolet light, and converts the light energy into heat energy. On the other hand, the quencher is a compound that receives light energy absorbed by the substance desired to be protected, and converts the light energy into heat energy.

The quencher may occasionally have a problem of volatility thereof. If the quencher has high volatility, the quencher may volatilize in a process of injecting the liquid crystal composition to which the quencher is added to the device, thus causing inconsistency between an adding amount and an effect thereof. Accordingly, the volatility of the quencher is preferably as low as possible. Compound (1) is the useful quencher from such a viewpoint.

Third, the combination of components in the composition, a preferred proportion of the component compounds and the basis thereof will be described. Preferred combinations of components in the composition include a combination of compound (1) and compound (2), a combination of compound (1), compound (2) and compound (3), a combination of compound (1), compound (2) and compound (4), or a combination of compound (1), compound (2), compound (3) and compound (4). Further preferred combinations thereof include a combination of compound (1), compound (2) and compound (3) or a combination of compound (1), compound (2), compound (3) and compound (4).

A preferred proportion of compound (1) is about 0.005°, by weight or more for increasing the stability to ultraviolet light or heat, and about 2% by weight or less for decreasing the minimum temperature, based on the weight of the liquid crystal composition. A further preferred proportion is in the range from about 0.05% by weight to about 1.50 by weight. A particularly preferred proportion is in the range from about 0.8% by weight to about 1.3% by weight.

A preferred proportion of compound (2) is about 10% by weight or more for increasing the dielectric anisotropy, and about 85% by weight or less for decreasing the minimum temperature or for decreasing the viscosity. A further preferred proportion is in the range from about 20% by weight to about 80% by weight. A particularly preferred proportion is in the range from about 30% by weight to about 70% by weight.

A preferred proportion of compound (3) is about 10% by weight or more for increasing the maximum temperature or decreasing the viscosity, and about 85% by weight or less for increasing the dielectric anisotropy. A further preferred proportion is in the range from about 20% by weight to about 80% by weight. A particularly preferred proportion is in the range from about 25% by weight to about 70% by weight.

A preferred proportion of compound (4) is about 3% by weight or more for increasing the dielectric constant in a minor axis direction, and about 25% by weight or less for decreasing the minimum temperature. A further preferred proportion is in the range from about 5% by weight to about 20% by weight. A particularly preferred proportion is in the range from about 5% by weight to about 15% by weight.

Fourth, the preferred embodiment of the component compounds will be described. In formula (2), formula (3) and formula (4), $R^1$ is alkyl having 1 to 12 carbons, alkoxy having 1 to 12 carbons or alkenyl having 2 to 12 carbons. Preferred $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine. Preferred $R^2$ or $R^3$ is alkenyl having 2 to 12 carbons for decreasing the viscosity, and alkyl having 1 to 12 carbons for increasing the stability to ultraviolet light or heat. $R^4$ and $R^5$ are independently alkyl having 1 to 12 carbons, alkoxy having 1 to 12 carbons, alkenyl having 2 to 12 carbons or alkenyloxy having 2 to 12 carbons. Preferred $R^4$ or $R^5$ is alkyl having 1 to 12 carbons for increasing the stability to ultraviolet light or heat, and alkoxy having 1 to 12 carbons for increasing the dielectric anisotropy.

Preferred alkyl is methyl, ethyl, propyl, butyl, pentyl, hexyl, heptyl or octyl. Further preferred alkyl is methyl, ethyl, propyl, butyl or pentyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. For decreasing the viscosity, further preferred alkenyloxy is allyloxy or 3-butenyloxy.

Preferred examples of alkyl in which at least one hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Preferred examples of alkenyl in which at least one hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring A is 1,4-phenylene or 2-fluoro-1,4-phenylene for increasing the optical anisotropy. Tetrahydropyran-2,5-diyl includes:

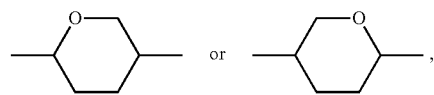

preferably

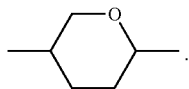

Ring B and ring C are independently 1,4-cyclohexylene, 1,4-phenylene, 2-fluoro-1,4-phenylene or 2,5-difluoro-1,4-phenylene. Preferred ring B or ring C is 1,4-cyclohexylene for decreasing the viscosity or 1,4-phenylene for increasing the optical anisotropy. Ring D and ring F are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine. Preferred ring D or ring F is 1,4-cyclohexylene for decreasing the viscosity, tetrahydropyran-2,5-diyl for increasing the dielectric anisotropy and 1,4-phenylene for increasing the optical anisotropy. Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for increasing the dielectric anisotropy.

$Z^1$ is a single bond, ethylene, carbonyloxy or difluoromethyleneoxy. Preferred $Z^1$ is a single bond for decreasing the viscosity and difluoromethyleneoxy for increasing the dielectric anisotropy. $Z^2$ is a single bond, ethylene or carbonyloxy. Preferred $Z^2$ is a single bond for decreasing the viscosity. $Z^3$ and $Z^4$ are independently a single bond, ethylene, carbonyloxy or methyleneoxy. Preferred $Z^3$ or $Z^4$ is a single bond for decreasing the viscosity, and methyleneoxy for increasing the dielectric anisotropy.

$X^1$ and $X^2$ are independently hydrogen or fluorine. Preferred $X^1$ or $X^2$ is fluorine for increasing the dielectric anisotropy.

$Y^1$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine. Preferred $Y^1$ is fluorine for decreasing the minimum temperature.

Preferred examples of alkyl in which at least one hydrogen is replaced by fluorine or chlorine include trifluoromethyl. Preferred examples of alkoxy in which at least one hydrogen is replaced by fluorine or chlorine include trifluoromethoxy. Preferred examples of alkenyloxy in which at least one hydrogen is replaced by fluorine or chlorine include trifluorovinyloxy.

Then, a is 1, 2, 3 or 4. Preferred a is 2 for decreasing the minimum temperature, and 3 for increasing the dielectric anisotropy. Then, b is 1, 2 or 3. Preferred b is 1 for decreasing the viscosity, and 2 or 3 for increasing the maximum temperature. Then, c is 1, 2 or 3, d is 0 or 1, and a sum of c and d is 3 or less. Preferred c is 1 for decreasing the viscosity, and 2 or 3 for increasing the maximum temperature. Preferred d is 0 for decreasing the viscosity, and 1 for decreasing the minimum temperature.

Fifth, the preferred component compound will be described. Preferred compound (2) includes compound (2-1) to compound (2-35) described in item 4. In the above compounds, at least one of the first components preferably includes compound (2-4), compound (2-12), compound (2-14), compound (2-15), compound (2-17), compound (2-18), compound (2-23), compound (2-24), compound (2-27), compound (2-29) or compound (2-30). At least two of the first components preferably includes a combination of compound (2-12) and compound (2-15), a combination of compound (2-14) and compound (2-27), a combination of compound (2-18) and compound (2-24), a combination of compound (2-18) and compound (2-29), a combination of compound (2-24) and compound (2-29), or a combination of compound (2-29) and compound (2-30).

Preferred compound (3) includes compound (3-1) to compound (3-13) described in item 7. In the above compounds, at least one of the second components preferably includes compound (3-1), compound (3-3), compound (3-5), compound (3-6) or compound (3-7). At least two of the second components preferably includes a combination of compound (3-1) and compound (3-5), a combination of compound (3-1) and compound (3-6), a combination of compound (3-1) and compound (3-7), a combination of compound (3-3) and compound (3-5), a combination of compound (3-3) and compound (3-6), or a combination of compound (3-3) and compound (3-7).

Preferred compound (4) includes compound (4-1) to compound (4-22) described in item 10. In the above compounds, at least one of the third component preferably includes compound (4-1), compound (4-3), compound (4-4), compound (4-6), compound (4-8) or compound (4-10). At least two of the third components preferably includes a combination of compound (4-1) and compound (4-6), a combination of compound (4-3) and compound (4-6), a combination of compound (4-3) and compound (4-10), a combination of compound (4-4) and compound (4-6), a combination of compound (4-4) and compound (4-8), or a combination of compound (4-6) and compound (4-10).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor. The optically active compound is added to the composition for the purpose of inducing a helical structure in liquid crystal molecules to give a twist angle. Examples of such a compound include compound (5-1) to compound (5-5). A preferred proportion of the optically active compound is about 5% by weight or less. A further preferred proportion is in the range from about 0.01% by weight to about 2% by weight.

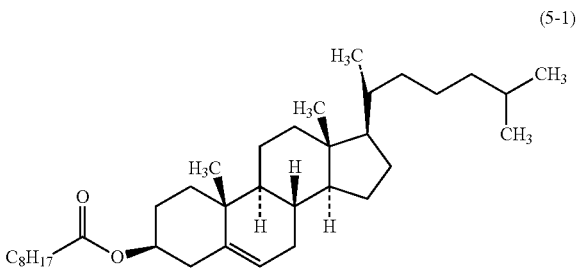

(5-1)

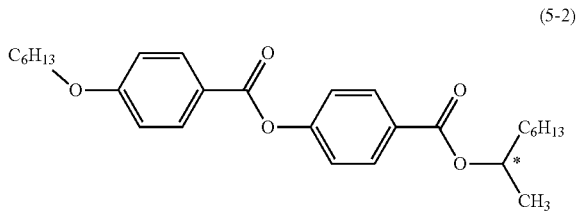

(5-2)

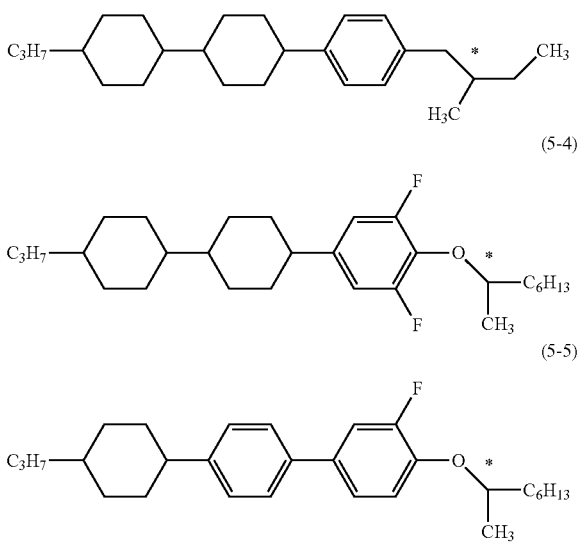

(5-3)

(5-4)

(5-5)

The antioxidant is added to the composition for preventing a decrease in the specific resistance caused by heating in air, or for maintaining a large voltage holding ratio at room temperature and also at a temperature close to the maximum temperature even after the device has been used for a long period of time. Preferred examples of an antioxidant include compound (6) in which n is an integer from 1 to 9.

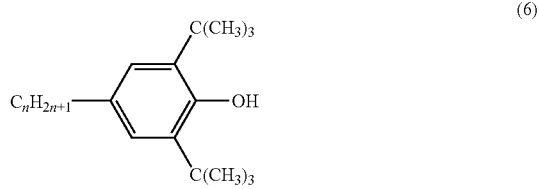

(6)

In compound (6), preferred n is 1, 3, 5, 7 or 9. Further preferred n is 7. Compound (6) in which n is 7 has small volatility, and therefore is effective in maintaining a large voltage holding ratio at room temperature and also at a temperature close to the maximum temperature even after the device has been used for a long period of time. A preferred proportion of the antioxidant is about 50 ppm or more for achieving an effect thereof, and about 600 ppm or less for avoiding a decrease in the maximum temperature or an increase in the minimum temperature. A further preferred proportion is in the range from about 100 ppm to about 300 ppm.

Compound (1) is useful as the quencher. The ultraviolet light absorber may be added to the composition together with the quencher. Preferred examples of such an ultraviolet light absorber include a benzophenone derivative, a benzoate derivative and a triazole derivative. The light stabilizer such as amine having steric hindrance is also preferred.

A dichroic dye such as an azo dye or an anthraquinone dye is added to the composition to be adapted for a device having a guest host (GH) mode. A preferred proportion of the dye is in the range from about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range from about 1 ppm to about 500 ppm.

The polymerizable compound is added to the composition to be adapted for a polymer sustained alignment (PSA) mode device. Preferred examples of the polymerizable compound include a compound having a polymerizable group such as acrylate, methacrylate, a vinyl compound, a vinyloxy compound, propenyl ether, an epoxy compound (oxirane, oxetane) and vinyl ketone. Further preferred examples include an acrylate derivative or a methacrylate derivative. A preferred proportion of the polymerizable compound is about 0.05% by weight or more for achieving an effect thereof, and about 10% by weight or less for preventing poor display. A further preferred proportion is in the range from about 0.1% by weight to about 2% by weight. The polymerizable compound is polymerized by irradiation with ultraviolet light. The polymerizable compound may be polymerized in the presence of an initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range from about 0.1% by weight to about 5% by weight based on the weight of the polymerizable compound. A further preferred proportion is in the range from about 1% by weight to about 3% by weight.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. Compound (1) is prepared by the method described in Journal of the American Chemical Society (1953), 75, 3210. Compound (2-4) is prepared by the method described in JP H10-204016 A. Compound (3-1) is prepared by the method described in JP S59-176221 A. Compound (4-1) is prepared by the method described in JP H2-503441 A. The antioxidant is commercially available. A compound in which n in formula (6) is 1 is available from Sigma-Aldrich Corporation. Compound (6) in which n is 7 or the like is prepared by the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. The composition mainly has a minimum temperature of about −10° C. or lower, a maximum temperature of about 70° C. or higher, and an optical anisotropy in the range from about 0.07 to about 0.20. A composition having optical anisotropy in the range from about 0.08 to about 0.25 may be prepared by controlling a proportion of the component compounds or by mixing any other liquid crystal compound. A composition having an optical anisotropy in the range from about 0.10 to about 0.30 may be prepared by trial and error. A device including the composition has large voltage holding ratio. The composition is suitable for use in the AM device. The composition is particularly suitable for use in a transmissive AM device. The composition can be used as the composition having the nematic phase, or as the optically active composition by adding the optically active compound.

The composition can be used in the AM device. The composition can also be used in a PM device. The composition can also be used in an AM device and a PM device each having a mode such as the PC mode, the TN mode, the STN mode, the ECB mode, the OCB mode, the IPS mode, the FFS mode, the VA mode and the FPA mode. Use in the AM device having the TN mode, the OCB mode, the IPS mode or the FFS mode is particularly preferred. In the AM device having the IPS mode or the FFS mode, alignment of liquid crystal molecules when no voltage is applied may be parallel or perpendicular to a glass substrate. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, or a polymer dispersed (PD) device in which a three-dimensional network-polymer is formed in the composition.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples are mixed. The thus prepared compound was identified by methods such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL/min). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1%, by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of the liquid crystal compounds is analyzed by gas chromatography (FID). An area ratio of each peak in the gas chromatogram corresponds to the ratio of the liquid crystal compound. When the capillary columns described above were used, a correction coefficient of each of the liquid crystal compounds may be regarded as 1. Accordingly, the proportion (% by weight) of the liquid crystal compounds can be calculated from the area ratio of each peak.

Sample for measurement: When characteristics of the composition or the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

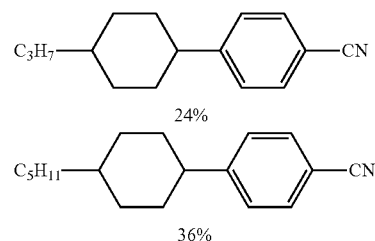

-continued

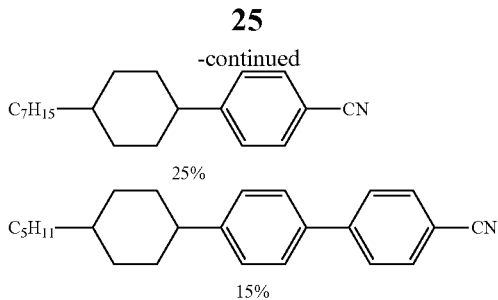

Measuring method: Characteristics were measured according to methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase (TC; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., Tc was expressed as Tc<−20° C. A minimum temperature of the nematic phase may be occasionally abbreviated as "minimum temperature."

(3) Viscosity (bulk viscosity; n; measured at 20° C.; mPa·s): For measurement, an E type rotational viscometer made by Tokyo Keiki Inc. was used.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range from 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of a transient current generated by the applied voltage were measured. A value of rotational viscosity was obtained from the measured values and calculation equation (8) on page 40 of the paper presented by M. Imai et al. A value of dielectric anisotropy required for the calculation was determined using the device by which the rotational viscosity was measured and by a method described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to a direction of rubbing. A refractive index (n⊥) was measured when the direction of polarized light was perpendicular to the direction of rubbing. A value of optical anisotropy was calculated from an equation: $\Delta\eta = n\| - n\bot$.

(6) Dielectric anisotropy (Δε; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant (ε⊥) of liquid crystal molecules in a minor axis direction was measured. A value of dielectric anisotropy was calculated from an equation: $\Delta\varepsilon = \varepsilon\| - \varepsilon\bot$.

(7) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of voltage at 90% transmittance.

(8) Voltage holding ratio (VHR-9; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 1 V) was applied to the TN device and the device was charged. A decaying voltage was measured for 166.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-10; measured at 60° C.; %): A voltage holding ratio was measured according to procedures identical with the procedures described above except that measurement was carried out at 60° C. in place of 25° C. The value thus obtained was expressed in terms of VHR-10.

(10) Voltage holding ratio (VHR-11; measured at 60° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and the device was irradiated with ultraviolet light at 5 mW/cm² for 167 minutes. A light source was a black light F40T10/BL (peak wavelength 369 nanometers) made by Eye Graphics Co. Ltd., and a distance between the device and the light source was 5 millimeters. In measurement of VHR-11, a decaying voltage was measured for 166.7 milliseconds. A composition having large VHR-11 has a large stability to ultraviolet light.

(11) Voltage holding ratio (VHR-12; measured at 60° C.; %): Stability to heat was evaluated by measuring a voltage holding ratio after a TN device into which a sample was injected was heated in a constant-temperature bath at 120° C. for 20 hours. In measurement of VHR-12, a decaying voltage was measured for 166.7 milliseconds. A composition having large VHR-12 has a large stability to heat.

(12) Response time (i; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time ($\tau r$; millisecond) was expressed in terms of time required for a change from 90% transmittance to 10% transmittance. A fall time ($\tau f$; millisecond) was expressed in terms of time required for a change from 10% transmittance to 90% transmittance. A response time was expressed by a sum of the rise time and the fall time thus determined.

(13) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; Nikkan Kogyo Shimbun, Ltd.), and values of K11 and K33 were obtained from equation (2.99). Next, K22 was calculated using the previously determined values of K11 and K33 in equation (3.18) on page 171. Elastic constant was expressed in terms of a mean value of the thus determined K11, K22 and K33.

(14) Specific resistance (p; measured at 25° C.; Ωcm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Helical pitch (P; measured at room temperature; μm): A helical pitch was measured according to a wedge method. Refer to page 196 in "Handbook of Liquid Crystals (Ekisho Binran in Japanese)" (issued in 2000, Maruzen Co., Ltd.). A sample was injected into a wedge cell and left to stand at room temperature for 2 hours, and then a gap (d2−d1) between disclination lines was observed by a polarizing microscope (trade name: MM40/60 Series, Nikon Corporation). A helical pitch (P) was calculated according to the following equation in which an angle of the wedge cell was expressed as θ: P=2×(d2−d1)×tan θ.

(16) Dielectric constant ($\varepsilon\perp$; measured at 25° C.) in minor axis direction: A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant ($\varepsilon\perp$) of liquid crystal molecules in the minor axis direction was measured.

The compounds in Examples were represented by symbols based on the definition of the following Table 3. In Table 3, a configuration of 1,4-cyclohexylene is trans. In Examples, parenthesized numbers described after the symbols correspond to the number of compounds. A symbol (-) means any other liquid crystal compound. A proportion (percentage) of the liquid crystal compound is a weight percent (% by weight) based on the weight of the liquid crystal composition. Values of characteristics of the composition were summarized in a last part.

TABLE 3

| Method for description of compounds using symbols R—($A_1$)—$Z_1$— . . . —$Z_n$—($A_n$)—R' | |
|---|---|
| 1) Left-terminal group R— | Symbol |
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| F—$C_nH_{2n}$— | Fn— |
| 2) Right-terminal group —R' | Symbol |
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |
| —CF=CH—$CF_3$ | —FVCF3 |
| 3) Bonding group —$Z_n$— | Symbol |
| —$C_2H_4$— | 2 |
| —COO— | E |
| —CH=CH— | V |
| —C≡C— | T |
| —$CF_2O$— | X |
| —$OCF_2$— | x |
| —$CH_2O$— | 1O |
| 4) Ring structure —$A_n$— | Symbol |
|  | H |
| 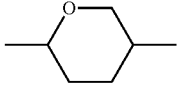 | Dh |
| 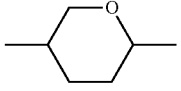 | dh |
| 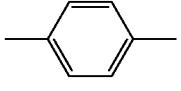 | B |

TABLE 3-continued

Method for description of compounds using symbols
R—(A₁)—Z₁— . . . —Zₙ—(Aₙ)—R'

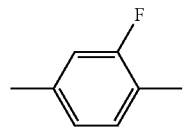 B(F)

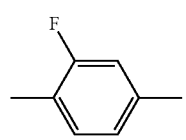 B(2F)

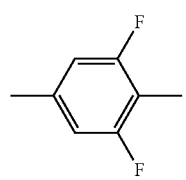 B(F,F)

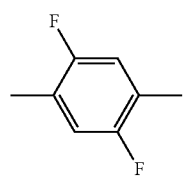 B(2F,5F)

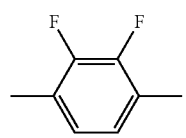 B(2F,3F)

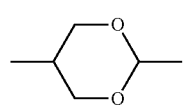 G

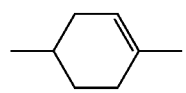 ch

5) Examples of description

Example 1  3—BB(F,F)XB(F,F)—F

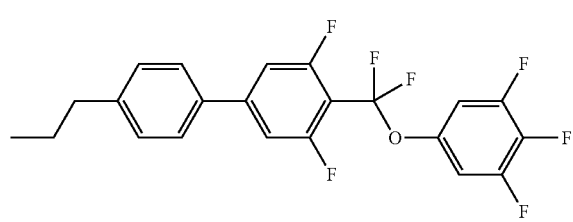 [SMILES: CCCc1ccc(-c2cc(F)c(C(F)(F)Oc3cc(F)c(F)c(F)c3)c(F)c2)cc1]

Example 2  3—HH—V

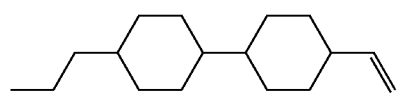 [SMILES: C=CC1CCC(C2CCC(CCC)CC2)CC1]

TABLE 3-continued

Method for description of compounds using symbols
R—(A₁)—Z₁— . . . —Zₙ—(Aₙ)—R'

Example 3  3—BB(F)B(F,F)—F

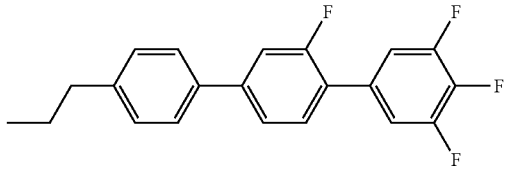 [SMILES: CCCc1ccc(-c2ccc(-c3cc(F)c(F)c(F)c3)c(F)c2)cc1]

Example 4  3—HBB(2F,3F)—O2

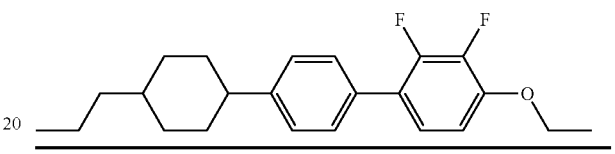

Example 1

| | | |
|---|---|---|
| 3-HHXB(F,F)-F | (2-4) | 6% |
| 3-BB(F,F)XB(F,F)-F | (2-18) | 13% |
| 3-HHBB(F,F)-F | (2-19) | 4% |
| 4-HHBB(F,F)-F | (2-19) | 5% |
| 3-HBBXB(F,F)-F | (2-23) | 3% |
| 3-BB(F)B(F,F)XB(F)-F | (2-28) | 2% |
| 4-BB(F)B(F,F)XB(F,F)-F | (2-29) | 8% |
| 5-BB(F)B(F,F)XB(F,F)-F | (2-29) | 7% |
| 3-HH-V | (3-1) | 44% |
| V-HHB-1 | (3-5) | 6% |
| 2-BB(F)B-3 | (3-8) | 2% |

NI=79.8° C.; Tc<−30° C.; Δη=0.106; Δε=8.5; Vth=1.45 V; η=11.6 mPa·s; γ1=60.0 mPa·s.

To the above composition, compound (1) was added in a proportion of 1.0% by weight, and VHR-11 was measured.
VHR-11=61.4%

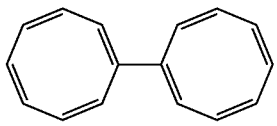 (1)

Comparative Example 1

To the composition in Example 1, compound (1) was not added, and VHR-11 was measured.
VHR-11=38.0%

Example 2

| | | |
|---|---|---|
| 5-HXB(F,F)-F | (2-1) | 3% |
| 3-HHXB(F,F)-F | (2-4) | 3% |
| 3-HHXB(F,F)-CF3 | (2-5) | 3% |
| 3-HGB(F,F)-F | (2-6) | 3% |
| 3-HB(F)B(F,F)-F | (2-9) | 5% |
| 3-BB(F,F)XB(F,F)-F | (2-18) | 6% |
| 3-HHBB(F,F)-F | (2-19) | 6% |
| 5-BB(F)B(F,F)XB(F)B(F,F)-F | (2-31) | 2% |
| 3-BB(2F, 3F)XB(F,F)-F | (2-32) | 4% |

-continued

| | | |
|---|---|---|
| 3-B(2F, 3F)BXB(F,F)-F | (2-33) | 5% |
| 3-HHB(F,F)XB(F,F)-F | (2) | 4% |
| 3-HB-CL | (2) | 3% |
| 3-HHB-OCF3 | (2) | 3% |
| 3-HH-V | (3-1) | 22% |
| 3-HH-V1 | (3-1) | 10% |
| 5-HB-O2 | (3-2) | 5% |
| 3-HHEH-3 | (3-4) | 3% |
| 3-HBB-2 | (3-6) | 7% |
| 5-B(F)BB-3 | (3-7) | 3% |

NI=71.2° C.; Tc<−20° C.; Δη=0.099; Δε=6.1; Vth=1.74 V; η=13.2 mPa·s; γ1=59.3 mPa·s.

To the above composition, compound (1) was added in a proportion of 1.0% by weight, and VHR-11 was measured. VHR-11=59.80

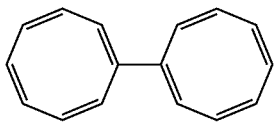

(1)

Example 3

| | | |
|---|---|---|
| 5-HXB(F,F)-F | (2-1) | 6% |
| 3-HHXB(F,F)-F | (2-4) | 6% |
| V-HB(F)B(F,F)-F | (2-9) | 5% |
| 3-HHB(F)B(F,F)-F | (2-20) | 7% |
| 2-BB(F)B(F,F)XB(F)-F | (2-28) | 3% |
| 3-BB(F)B(F,F)XB(F)-F | (2-28) | 3% |
| 4-BB(F)B(F,F)XB(F)-F | (2-28) | 4% |
| 5-HB-CL | (2) | 5% |
| 2-HH-5 | (3-1) | 8% |
| 3-HH-V | (3-1) | 10% |
| 3-HH-V1 | (3-1) | 7% |
| 4-HH-V | (3-1) | 10% |
| 4-HH-V1 | (3-1) | 8% |
| 5-HB-O2 | (3-2) | 7% |
| 4-HHEH-3 | (3-4) | 3% |
| 1-BB(F)B-2V | (3-8) | 3% |
| 1O1-HBBH-3 | (—) | 5% |

NI=78.5° C.; Tc<−20° C.; Δn=0.095; Δε=3.4; Vth=1.50 V; η=8.4 mPa·s; γ1=54.2 mPa·s.

To the above composition, compound (1) was added in a proportion of 1.2% by weight, and VHR-11 was measured. VHR-11=64.3%

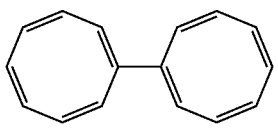

(1)

Example 4

| | | |
|---|---|---|
| 3-HHEB(F,F)-F | (2-3) | 5% |
| 3-HHXB(F,F)-F | (2-4) | 7% |

-continued

| | | |
|---|---|---|
| 5-HBEB(F,F)-F | (2-10) | 5% |
| 3-BB(F,F)XB(F,F)-F | (2-18) | 10% |
| 2-HHB(F)B(F,F)-F | (2-20) | 3% |
| 3-HB(2F, 3F)BXB(F,F)-F | (2-34) | 3% |
| 3-BB(2F, 3F)BXB(F,F)-F | (2-35) | 2% |
| 5-HHB(F,F)XB(F,F)-F | (2) | 6% |
| 2-HH-3 | (3-1) | 8% |
| 3-HH-V | (3-1) | 20% |
| 3-HH-V1 | (3-1) | 7% |
| 4-HH-V | (3-1) | 6% |
| 5-HB-O2 | (3-2) | 5% |
| V2-B2BB-1 | (3-9) | 3% |
| 3-HHEBH-3 | (3-11) | 5% |
| 3-HHEBH-5 | (3-11) | 5% |

NI=90.3° C.; Tc<−20° C.; Δn=0.089; Δε=5.5; Vth=1.65 V; η=13.6 mPa·s; γ1=60.1 mPa·s.

To the above composition, compound (1) was added in a proportion of 1.0% by weight, and VHR-11 was measured. VHR-11=61.2%

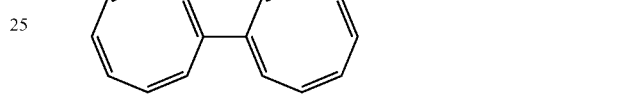

(1)

Example 5

| | | |
|---|---|---|
| 3-BB(F,F)XB(F,F)-F | (2-18) | 12% |
| 3-HHBB(F,F)-F | (2-19) | 5% |
| 4-HHBB(F,F)-F | (2-19) | 4% |
| 3-HBBXB(F,F)-F | (2-23) | 3% |
| 3-BB(F)B(F,F)XB(F)-F | (2-28) | 3% |
| 3-BB(F)B(F,F)XB(F,F)-F | (2-29) | 3% |
| 4-BB(F)B(F,F)XB(F,F)-F | (2-29) | 5% |
| 5-BB(F)B(F,F)XB(F,F)-F | (2-29) | 4% |
| 2-HH-3 | (3-1) | 6% |
| 3-HH-5 | (3-1) | 6% |
| 3-HH-V | (3-1) | 25% |
| 3-HH-VFF | (3-1) | 6% |
| 5-HB-O2 | (3-2) | 7% |
| V-HHB-1 | (3-5) | 6% |
| V-HBB-2 | (3-6) | 5% |

NI=78.3° C.; Tc<−20° C.; Δn=0.107; Δε=7.0; Vth=1.55 V; η=11.6 mPa·s; γ1=55.6 mPa·s.

To the above composition, compound (1) was added in a proportion of 1.3% by weight, and VHR-11 was measured. VHR-11=63.0%

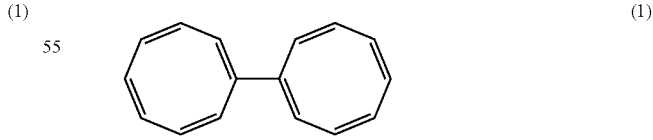

(1)

Example 6

| | | |
|---|---|---|
| 3-HHXB(F,F)-F | (2-4) | 3% |
| 3-BBXB(F,F)-F | (2-17) | 3% |

-continued

| | | |
|---|---|---|
| 3-BB(F,F)XB(F,F)-F | (2-18) | 8% |
| 3-HHBB(F,F)-F | (2-19) | 5% |
| 4-HHBB(F,F)-F | (2-19) | 4% |
| 3-BB(F)B(F,F)XB(F,F)-F | (2-29) | 3% |
| 4-BB(F)B(F,F)XB(F,F)-F | (2-29) | 6% |
| 5-BB(F)B(F,F)XB(F,F)-F | (2-29) | 5% |
| 3-HH-V | (3-1) | 30% |
| 3-HH-V1 | (3-1) | 5% |
| 3-HHB-O1 | (3-5) | 2% |
| V-HHB-1 | (3-5) | 5% |
| 2-BB(F)B-3 | (3-8) | 6% |
| F3-HH-V | (—) | 15% |

NI=80.4° C.; Tc<−20° C.; Δn=0.106; Δε=5.8; Vth=1.40 V; η=11.6 mPa·s; γ1=61.0 mPa·s.

To the above composition, compound (1) was added in a proportion of 1.1% by weight, and VHR-11 was measured.

VHR-11=65.8%

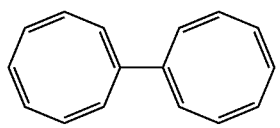
(1)

Example 7

| | | |
|---|---|---|
| 3-HGB(F,F)-F | (2-6) | 3% |
| 5-GHB(F,F)-F | (2-7) | 4% |
| 3-GB(F,F)XB(F,F)-F | (2-14) | 5% |
| 3-BB(F)B(F,F)-CF3 | (2-16) | 2% |
| 3-HHBB(F,F)-F | (2-19) | 4% |
| 3-GBB(F)B(F,F)-F | (2-22) | 2% |
| 2-dhBB(F,F)XB(F,F)-F | (2-25) | 4% |
| 3-GB(F)B(F,F)XB(F,F)-F | (2-27) | 3% |
| 3-HGB(F,F)XB(F,F)-F | (2) | 5% |
| 7-HB(F,F)-F | (2) | 3% |
| 2-HH-3 | (3-1) | 14% |
| 2-HH-5 | (3-1) | 4% |
| 3-HH-V | (3-1) | 26% |
| 1V2-HH-3 | (3-1) | 5% |
| 1V2-BB-1 | (3-3) | 3% |
| 2-BB(F)B-3 | (3-8) | 3% |
| 3-HB(F)HH-2 | (3-10) | 4% |
| 5-HBB(F)B-2 | (3-13) | 6% |

NI=78.4° C.; Tc<−20° C.; Δn=0.094; Δε=5.6; Vth=1.45 V; η=11.5 mPa·s; γ1=61.7 mPa·s.

To the above composition, compound (1) was added in a proportion of 1.2% by weight, and VHR-11 was measured.

VHR-11=60.9%

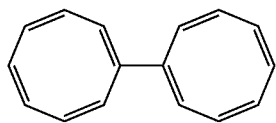
(1)

Example 8

| | | |
|---|---|---|
| 3-HBB(F,F)-F | (2-8) | 5% |
| 5-HBB(F,F)-F | (2-8) | 4% |
| 3-BB(F)B(F,F)-F | (2-15) | 3% |
| 3-BB(F)B(F,F)XB(F,F)-F | (2-29) | 3% |
| 4-BB(F)B(F,F)XB(F,F)-F | (2-29) | 5% |
| 3-BB(F,F)XB(F)B(F,F)-F | (2-30) | 3% |
| 5-BB(F)B(F,F)XB(F)B(F,F)-F | (2-31) | 4% |
| 3-HH2BB(F,F)-F | (2) | 3% |
| 4-HH2BB(F,F)-F | (2) | 3% |
| 2-HH-5 | (3-1) | 8% |
| 3-HH-V | (3-1) | 25% |
| 3-HH-V1 | (3-1) | 7% |
| 4-HH-V1 | (3-1) | 6% |
| 5-HB-O2 | (3-2) | 5% |
| 7-HB-1 | (3-2) | 5% |
| VFF-HHB-O1 | (3-5) | 8% |
| VFF-HHB-1 | (3-5) | 3% |

NI=80.0° C.; Tc<−20° C.; Δn=0.101; Δε=4.6; Vth=1.71 V; η=11.0 mPa·s; γ1=47.2 mPa·s.

To the above composition, compound (1) was added in a proportion of 1.3% by weight, and VHR-11 was measured.

VHR-11=66.2%

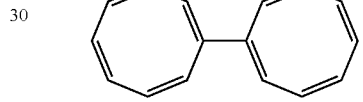
(1)

Example 9

| | | |
|---|---|---|
| 3-HHB(F,F)-F | (2-2) | 8% |
| 3-GB(F)B(F)-F | (2-11) | 2% |
| 3-GB(F)B(F,F)-F | (2-12) | 3% |
| 3-BB(F,F)XB(F,F)-F | (2-18) | 8% |
| 3-GB(F)B(F,F)XB(F,F)-F | (2-27) | 6% |
| 5-GB(F)B(F,F)XB(F,F)-F | (2-27) | 5% |
| 3-HH-V | (3-1) | 30% |
| 3-HH-V1 | (3-1) | 10% |
| 1V2-HH-3 | (3-1) | 8% |
| 3-HH-VFF | (3-1) | 8% |
| V2-BB-1 | (3-3) | 2% |
| 5-HB(F)BH-3 | (3-12) | 5% |
| 5-HBBH-3 | (3) | 5% |

NI=78.6° C.; Tc<−20° C.; Δn=0.088; Δε=5.6; Vth=1.85 V; η=13.9 mPa·s; γ1=66.9 mPa·s.

To the above composition, compound (1) was added in a proportion of 0.8% by weight, and VHR-11 was measured.

VHR-11=58.3%

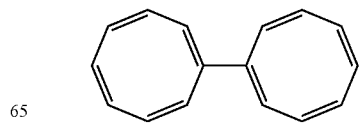
(1)

Example 10

| | | |
|---|---|---|
| 3-HHEB(F,F)-F | (2-3) | 4% |
| 5-HHEB(F,F)-F | (2-3) | 3% |
| 3-HBEB(F,F)-F | (2-10) | 3% |
| 5-HBEB(F,F)-F | (2-10) | 3% |
| 3-BB(F)B(F,F)-F | (2-15) | 3% |
| 3-GB(F)B(F,F)XB(F,F)-F | (2-27) | 5% |
| 4-GB(F)B(F,F)XB(F,F)-F | (2-27) | 5% |
| 5-HB-CL | (2) | 5% |
| 3-HHB-OCF3 | (2) | 4% |
| 3-HHB(F,F)XB(F,F)-F | (2) | 5% |
| 5-HHB(F,F)XB(F,F)-F | (2) | 3% |
| 3-HGB(F,F)XB(F,F)-F | (2) | 5% |
| 2-HH-5 | (3-1) | 3% |
| 3-HH-5 | (3-1) | 5% |
| 3-HH-V | (3-1) | 24% |
| 4-HH-V | (3-1) | 5% |
| 1V2-HH-3 | (3-1) | 5% |
| 3-HHEH-3 | (3-4) | 5% |
| 5-B(F)BB-2 | (3-7) | 3% |
| 5-B(F)BB-3 | (3-7) | 2% |

NI=82.9° C.; Tc<−20° C.; Δn=0.093; Δε=6.9; Vth=1.50 V; η=16.3 mPa·s; γ1=65.2 mPa·s.

To the above composition, compound (1) was added in a proportion of 1.2% by weight, and VHR-11 was measured. VHR-11=60.3%

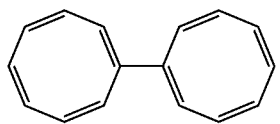
(1)

Example 11

| | | |
|---|---|---|
| 3-HHXB(F,F)-F | (2-4) | 9% |
| 3-HBB(F,F)-F | (2-8) | 3% |
| 3-BB(F)B(F,F)-F | (2-15) | 4% |
| 3-BB(F)B(F,F)-CF3 | (2-16) | 4% |
| 3-BB(F,F)XB(F,F)-F | (2-18) | 5% |
| 3-GBB(F)B(F,F)-F | (2-22) | 3% |
| 4-GBB(F)B(F,F)-F | (2-22) | 4% |
| 3-HH-V | (3-1) | 25% |
| 3-HH-V1 | (3-1) | 10% |
| 5-HB-O2 | (3-2) | 10% |
| 7-HB-1 | (3-2) | 5% |
| V2-BB-1 | (3-3) | 3% |
| 3-HHB-1 | (3-5) | 4% |
| 1V-HBB-2 | (3-6) | 5% |
| 5-HBB(F)B-2 | (3-13) | 6% |

NI=79.6° C.; Tc<−20° C.; Δn=0.111; Δε=4.7; Vth=1.86 V; η=9.7 mPa·s; γ1=49.9 mPa·s.

To the above composition, compound (1) was added in a proportion of 1.3% by weight, and VHR-11 was measured. VHR-11=62.8%

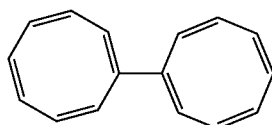
(1)

Example 12

| | | |
|---|---|---|
| 3-BB(F,F)XB(F,F)-F | (2-18) | 14% |
| 5-BB(F)B(F,F)XB(F,F)-F | (2-29) | 7% |
| 7-HB(F,F)-F | (2) | 6% |
| 2-HH-5 | (3-1) | 5% |
| 3-HH-V | (3-1) | 30% |
| 3-HH-V1 | (3-1) | 3% |
| 3-HH-VFF | (3-1) | 10% |
| 3-HHB-1 | (3-5) | 4% |
| 3-HHB-3 | (3-5) | 5% |
| 3-HHB-O1 | (3-5) | 3% |
| 1-BB(F)B-2V | (3-8) | 3% |
| 3-HHEBH-3 | (3-11) | 3% |
| 3-HHEBH-4 | (3-11) | 4% |
| 3-HHEBH-5 | (3-11) | 3% |

NI=83.0° C.; Tc<−20° C.; Δn=0.086; Δε=3.8; Vth=1.94 V; η=7.5 mPa·s; γ1=51.5 mPa·s.

To the above composition, compound (1) was added in a proportion of 1.3% by weight, and VHR-11 was measured. VHR-11=67.1%

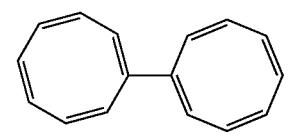
(1)

Example 13

| | | |
|---|---|---|
| 3-HBB(F,F)-F | (2-8) | 5% |
| 5-HBB(F,F)-F | (2-8) | 4% |
| 3-BB(F)B(F,F)-F | (2-15) | 3% |
| 3-BB(F)B(F,F)XB(F,F)-F | (2-29) | 3% |
| 4-BB(F)B(F,F)XB(F,F)-F | (2-29) | 5% |
| 3-BB(F,F)XB(F)B(F,F)-F | (2-30) | 3% |
| 5-BE(F)B(F,F)XB(F)B(F,F)-F | (2-31) | 4% |
| 3-HH2BB(F,F)-F | (2) | 3% |
| 4-HH2BB(F,F)-F | (2) | 3% |
| 2-HH-5 | (3-1) | 8% |
| 3-HH-V | (3-1) | 28% |
| 4-HH-V1 | (3-1) | 7% |
| 5-HB-O2 | (3-2) | 2% |
| 7-HB-1 | (3-2) | 5% |
| VFF-HHB-O1 | (3-5) | 8% |
| VFF-HHB-1 | (3-5) | 3% |
| 2-BB(2F,3F)B-3 | (4-9) | 4% |
| 3-HBB(2F,3F)-O2 | (4-10) | 2% |

NI=81.9° C.; Tc<−20° C.; Δn=0.109; Δε=4.8; Vth=1.75 V; η=13.3 mPa·s; γ1=57.4 mPa·s.

To the above composition, compound (1) was added in a proportion of 1.2% by weight, and VHR-11 was measured. VHR-11=63.1%

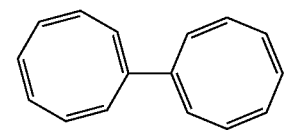
(1)

Example 14

| | | |
|---|---|---|
| 3-HHEB(F,F)-F | (2-3) | 4% |
| 3-HBEB(F,F)-F | (2-10) | 3% |
| 5-HBEB(F,F)-F | (2-10) | 3% |
| 3-BB(F)B(F,F)-F | (2-15) | 3% |
| 3-HBBXB(F,F)-F | (2-23) | 6% |
| 4-GBB(F,F)XB(F,F)-F | (2-26) | 2% |
| 5-GBB(F,F)XB(F,F)-F | (2-26) | 2% |
| 3-GB(F)B(F,F)XB(F,F)-F | (2-27) | 5% |
| 4-GB(F)B(F,F)XB(F,F)-F | (2-27) | 5% |
| 5-HHB(F,F)XB(F,F)-F | (2) | 3% |
| 5-HEB(F,F)-F | (2) | 3% |
| 5-HB-CL | (2) | 2% |
| 3-HHB-OCF3 | (2) | 4% |
| 3-HH-5 | (3-1) | 4% |
| 3-HH-V | (3-1) | 21% |
| 3-HH-V1 | (3-1) | 3% |
| 4-HH-V | (3-1) | 4% |
| 1V2-HH-3 | (3-1) | 6% |
| 5-B(F)BB-2 | (3-7) | 3% |
| 5-B(F)BB-3 | (3-7) | 2% |
| 3-HB(2F,3F)-O2 | (4-1) | 3% |
| 3-BB(2F,3F)-O2 | (4-4) | 2% |
| 3-HHB(2F,3F)-O2 | (4-6) | 4% |
| F3-HH-V | (—) | 3% |

NI=78.2° C.; Tc<−20° C.; Δn=0.101; Δε=6.7; Vth=1.45 V; η=17.8 mPa·s; γ1=67.8 mPa·s.

To the above composition, compound (1) was added in a proportion of 1.3% by weight, and VHR-11 was measured.
VHR-11=59.6%

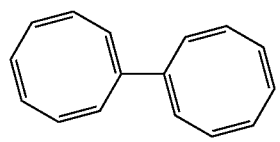
(1)

Example 15

| | | |
|---|---|---|
| 3-HHXB(F,F)-F | (2-4) | 7% |
| 3-BB(F)B(F,F)-F | (2-15) | 14% |
| 3-HH-V | (3-1) | 39% |
| 3-HH-V1 | (3-1) | 10% |
| 1V2-HH-3 | (3-1) | 6% |
| 1-BB-3 | (3-3) | 1% |
| V-HHB-1 | (3-5) | 3% |
| V2-HHB-1 | (3-5) | 5% |
| 2-HBB(2F,3F)-O2 | (4-10) | 3% |
| 3-HBB(2F,3F)-O2 | (4-10) | 9% |
| 4-HBB(2F,3F)-O2 | (4-10) | 3% |

NI=80.0° C.; Tc<−20° C.; Δn=0.098; Δε=1.8; Vth=2.79 V; η=10.9 mPa·s; γ1=43.0 mPa·s.

To the above composition, compound (1) was added in a proportion of 1.3% by weight, and VHR-11 was measured.
VHR-11=65.8%

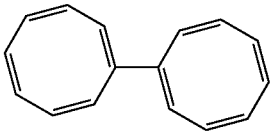

Example 16

| | | |
|---|---|---|
| 3-HHXB(F,F)-F | (2-4) | 1% |
| 3-BB(F)B(F,F)-F | (2-15) | 8% |
| 3-BB(F)B(F,F)-CF3 | (2-16) | 5% |
| 3-HH-V | (3-1) | 46% |
| 3-HH-V1 | (3-1) | 10% |
| 1V2-HH-3 | (3-1) | 6% |
| V-HHB-1 | (3-5) | 1% |
| 1-BB(F)B-2V | (3-8) | 6% |
| 2-BB(F)B-2V | (3-8) | 6% |
| 2-HBB(2F,3F)-O2 | (4-10) | 3% |
| 3-HBB(2F,3F)-O2 | (4-10) | 8% |

NI=75.5° C.; Tc<−20° C.; Δn=0.110; Δε=1.7; Vth=2.94 V; η=9.9 mPa·s; γ1=37.0 mPa·s.

To the above composition, compound (1) was added in a proportion of 1.0% by weight, and VHR-11 was measured.
VHR-11=60.0%

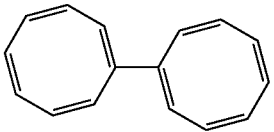
(1)

Example 17

| | | |
|---|---|---|
| 4-GB(F)B(F,F)XB(F,F)-F | (2-27) | 2% |
| 4-BB(F)B(F,F)XB(F,F)-F | (2-29) | 5% |
| 5-BB(F)B(F,F)XB(F,F)-F | (2-29) | 12% |
| 3-HH-V | (3-1) | 38% |
| 3-HH-V1 | (3-1) | 7% |
| V-HHB-1 | (3-5) | 9% |
| V2-HHB-1 | (3-5) | 7% |
| 3-HHB-1 | (3-5) | 8% |
| 2-BB(F)B-3 | (3-8) | 6% |
| 2-BB(F)B-5 | (3-8) | 6% |

NI=96.1° C.; Δn=0.113; Δε=3.9; Vth=2.22 V; γ1=63.0 mPa·s.

To the above composition, compound (1) was added in a proportion of 1.0% by weight, and VHR-11 was measured.
VHR-11=62.7%

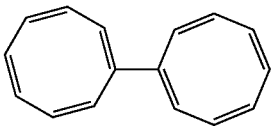
(1)

Example 18

| | | |
|---|---|---|
| 3-GB(F,F)XB(F,F)-F | (2-14) | 7% |
| 3-BB(F,F)XB(F,F)-F | (2-18) | 1% |
| 3-GBB(F)B(F,F)-F | (2-22) | 2% |
| 4-GBB(F)B(F,F)-F | (2-22) | 2% |
| 3-HBB(F,F)XB(F,F)-F | (2-24) | 8% |
| 3-GB(F)B(F,F)XB(F,F)-F | (2-27) | 1% |
| 4-GB(F)B(F,F)XB(F,F)-F | (2-27) | 2% |
| 5-GB(F)B(F,F)XB(F,F)-F | (2-27) | 2% |
| 3-HH-V | (3-1) | 34% |
| 3-HH-V1 | (3-1) | 3% |
| 1-BB-3 | (3-3) | 5% |
| V-HHB-1 | (3-5) | 14% |
| V2-HHB-1 | (3-5) | 13% |
| 3-HBB-2 | (3-6) | 6% |

NI=89.7° C.; Tc<−30° C.; Δn=0.100; Δε=5.5; Vth=1.83 V; η=11.8 mPa·s; γ1=55.0 mPa·s.

To the above composition, compound (1) was added in a proportion of 1.2% by weight, and VHR-11 was measured.

VHR-11=59.1%

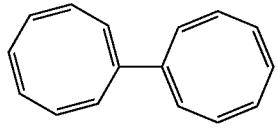

(1)

Example 19

| | | |
|---|---|---|
| 3-GB(F)B(F,F)-F | (2-12) | 5% |
| 3-GB(F,F)XB(F,F)-F | (2-14) | 8% |
| 3-BB(F,F)XB(F,F)-F | (2-18) | 6% |
| 4-GBB(F)B(F,F)-F | (2-22) | 3% |
| 3-HBBXB(F,F)-F | (2-23) | 6% |
| 3-HBB(F,F)XB(F,F)-F | (2-24) | 6% |
| 3-GB(F)B(F,F)XB(F,F)-F | (2-27) | 2% |
| 4-GB(F)B(F,F)XB(F,F)-F | (2-27) | 5% |
| 4-BB(F)B(F,F)XB(F,F)-F | (2-29) | 4% |
| 3-HH-V | (3-1) | 34% |
| 3-HH-V1 | (3-1) | 4% |
| V-HHB-1 | (3-5) | 8% |
| V2-HHB-1 | (3-5) | 8% |
| 1-BB(F)B-2V | (3-8) | 1% |

NI=80.7° C.; Tc<−30° C.; Δn=0.101; Δε=11.0; Vth=1.30 V; η=15.2 mPa·s; γ1=65.0 mPa·s.

To the above composition, compound (1) was added in a proportion of 1.3% by weight, and VHR-11 was measured.

VHR-11=58.3%

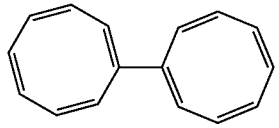

(1)

Example 20

| | | |
|---|---|---|
| 3-GB(F)B(F)-F | (2-11) | 9% |
| 3-GB(F)B(F,F)-F | (2-12) | 5% |
| 3-GB(F,F)XB(F,F)-F | (2-14) | 9.5% |
| 3-GB(F)B(F)B(F)-F | (2-21) | 3% |
| 3-GBB(F)B(F,F)-F | (2-22) | 1% |
| 4-GBB(F)B(F,F)-F | (2-22) | 3% |
| 4-GB(F)B(F,F)XB(F,F)-F | (2-27) | 2% |
| 4-BB(F)B(F,F)XB(F,F)-F | (2-29) | 3% |
| 3-HH-V | (3-1) | 37.5% |
| V-HHB-1 | (3-5) | 11% |
| V2-HHB-1 | (3-5) | 2% |
| 1-BB(F)B-2V | (3-8) | 4% |
| 2-BB(F)B-2V | (3-8) | 3% |
| 3-dhBB(2F,3F)-O2 | (4-17) | 7% |

NI=80.5° C.; Tc<−30° C.; Δη=0.110; Δε=8.0; Vth=1.53 V; γ1=74.0 mPa·s.

To the above composition, compound (1) was added in a proportion of 1.3% by weight, and VHR-11 was measured.

VHR-11=59.7%

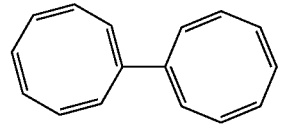

(1)

Example 21

| | | |
|---|---|---|
| 3-HHB(F,F)-F | (2-2) | 4% |
| 3-HHXB(F,F)-F | (2-4) | 12% |
| 3-BB(F,F)XB(F,F)-F | (2-18) | 13% |
| 2-HHBB(F,F)-F | (2-19) | 3% |
| 3-HHBB(F,F)-F | (2-19) | 3% |
| 3-HBBXB(F,F)-F | (2-23) | 6% |
| 3-HBB(F,F)XB(F,F)-F | (2-24) | 5.5% |
| 3-BB(F)B(F,F)XB(F,F)-F | (2-29) | 3% |
| 3-HH-V | (3-1) | 32% |
| 3-HB-O2 | (3-2) | 4.5% |
| 3-HHB-1 | (3-5) | 3% |
| V-HHB-1 | (3-5) | 7.5% |
| 3-HBB-2 | (3-6) | 2% |
| 1-BB(F)B-2V | (3-8) | 1.5% |

NI=85.7° C.; Tc<−30° C.; Δn=0.101; Δε=7.1; Vth=1.61 V; η=12.6 mPa·s.

To the above composition, compound (1) was added in a proportion of 1.2% by weight, and VHR-11 was measured.

VHR-11=62.6%

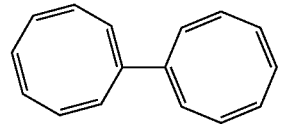

(1)

Example 22

| | | |
|---|---|---|
| 3-GB(F,F)XB(F,F)-F | (2-14) | 3% |
| 3-BB(F,F)XB(F,F)-F | (2-18) | 10% |
| 3-HHBB(F,F)-F | (2-19) | 5% |
| 3-HBB(F,F)XB(F,F)-F | (2-24) | 5% |
| 4-GB(F)B(F,F)XB(F,F)-F | (2-27) | 3% |
| 3-BB(F)B(F,F)XB(F,F)-F | (2-29) | 3% |
| 3-BB(F,F)XB(F)B(F,F)-F | (2-30) | 4% |
| 3-HH-V | (3-1) | 33% |
| 2-HH-3 | (3-1) | 5% |
| 3-HHB-3 | (3-5) | 6% |
| 3-HHB-1 | (3-5) | 7% |
| V-HHB-1 | (3-5) | 12% |
| 3-HBB-2 | (3-6) | 4% |

NI=90.3° C.; Δn=0.099; Δε=6.5; γ1=44.2 mPa·s.

To the above composition, compound (1) was added in a proportion of 1.0% by weight, and VHR-11 was measured.

VHR-11=60.3%

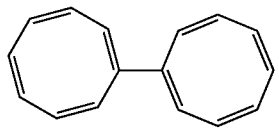

(1)

Example 23

| | | |
|---|---|---|
| 3-BB(F,F)XB(F,F)-F | (2-18) | 5% |
| 3-HBB(F,F)XB(F,F)-F | (2-24) | 3.5% |
| 3-BB(F)B(F,F)XB(F,F)-F | (2-29) | 2% |
| 4-BB(F)B(F,F)XB(F,F)-F | (2-29) | 3% |
| 5-BB(F)B(F,F)XB(F,F)-F | (2-29) | 3% |
| 3-HH-V | (3-1) | 34% |
| 3-HH-V1 | (3-1) | 7% |
| 3-HHB-1 | (3-5) | 3% |
| V-HHB-1 | (3-5) | 10% |
| V2-HHB-1 | (3-5) | 10.5% |
| V-HBB-2 | (3-6) | 4.5% |
| 1-BB(F)B-2V | (3-8) | 3% |
| 2-BB(F)B-2V | (3-8) | 3% |
| 3-BB(F)B-2V | (3-8) | 3% |
| 2-BB(F)B-3 | (3-8) | 3.5% |
| 5-HBB(F)B-2 | (3-13) | 2% |

NI=100.1° C.; Tc<−40° C.; Δn=0.120; Δε=3.0; Vth=2.61 V; η=11.9 mPa·s; γ1=48.0 mPa·s.

To the above composition, compound (1) was added in a proportion of 1.3% by weight, and VHR-11 was measured.

VHR-11=65.5%

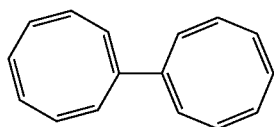

(1)

Example 24

| | | |
|---|---|---|
| 3-BB(F,F)XB(F,F)-F | (2-18) | 7% |
| 3-HBBXB(F,F)-F | (2-23) | 3% |
| 3-HBB(F,F)XB(F,F)-F | (2-24) | 2% |
| 3-BB(F)B(F,F)XB(F,F)-F | (2-29) | 3% |
| 3-HH-V | (3-1) | 36% |
| 3-HH-V1 | (3-1) | 6% |
| V-HHB-1 | (3-5) | 13% |
| V2-HHB-1 | (3-5) | 12% |
| 1-BB(F)B-2V | (3-8) | 2% |
| 2-BB(F)B-2V | (3-8) | 6% |
| 2-BB(F)B-3 | (3-8) | 5% |
| 3-BB(F)B-2V | (3-8) | 5% |

NI=95.3° C.; Tc<−40° C.; Δn=0.119; Δε=2.5; Vth=2.80 V; η=11.3 mPa·s; γ1=53.0 mPa·s.

To the above composition, compound (1) was added in a proportion of 1.3% by weight, and VHR-11 was measured.

VHR-11=67.8

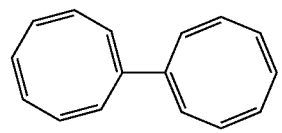

(1)

Example 25

| | | |
|---|---|---|
| 3-HHEB(F,F)-F | (2-3) | 4% |
| 3-BB(F,F)XB(F,F)-F | (2-18) | 3% |
| 3-HBBXB(F,F)-F | (2-23) | 2% |
| 3-GB(F)B(F,F)XB(F,F)-F | (2-27) | 2% |
| 4-GB(F)B(F,F)XB(F,F)-F | (2-27) | 3% |
| 3-BB(F)B(F,F)XB(F,F)-F | (2-29) | 2% |
| 4-BB(F)B(F,F)XB(F,F)-F | (2-29) | 5% |
| 3-HH-V | (3-1) | 38.5% |
| 3-HH-V1 | (3-1) | 3% |
| V-HHB-1 | (3-5) | 13% |
| V2-HHB-1 | (3-5) | 12% |
| 1-BB(F)B-2V | (3-8) | 2% |
| 2-BB(F)B-2V | (3-8) | 6% |
| 2-BB(F)B-3 | (3-8) | 2.5% |
| 3-HHEBH-3 | (3-11) | 2% |

NI=99.9° C.; Tc<−40° C.; Δn=0.108; Δε=4.0; Vth=2.20 V; η=11.9 mPa·s; γ1=62.0 mPa·s.

To the above composition, compound (1) was added in a proportion of 1.3% by weight, and VHR-11 was measured.

VHR-11=63.9%

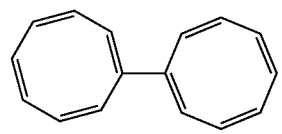

(1)

Example 26

| | | |
|---|---|---|
| 3-BB(F,F)XB(F,F)-F | (2-18) | 12.5% |
| 2-HHBB(F,F)-F | (2-19) | 2% |
| 3-HHBB(F,F)-F | (2-19) | 3% |
| 4-HHBB(F,F)-F | (2-19) | 2% |
| 5-HHBB(F,F)-F | (2-19) | 2% |
| 3-HBBXB(F,F)-F | (2-23) | 4% |
| 3-HBB(F,F)XB(F,F)-F | (2-24) | 5% |
| 4-GB(F)B(F,F)XB(F,F)-F | (2-27) | 2% |
| 5-GB(F)B(F,F)XB(F,F)-F | (2-27) | 1% |
| 3-HH-V | (3-1) | 33% |
| 3-HH-V1 | (3-1) | 4.5% |
| V-HHB-1 | (3-5) | 12% |
| V2-HHB-1 | (3-5) | 12% |
| 1-BB(F)B-2V | (3-8) | 2% |
| 2-BB(F)B-2V | (3-8) | 3% |

NI=100.9° C.; Tc<−40° C.; $\Delta n$=0.107; $\Delta \varepsilon$=5.5; Vth=1.94 V; $\eta$=12.6 mPa·s; $\gamma 1$=72.0 mPa·s.

To the above composition, compound (1) was added in a proportion of 1.2% by weight, and VHR-11 was measured.
VHR-11=62.2%

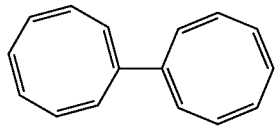

(1)

Example 27

| | | |
|---|---|---|
| 3-BB(F,F)XB(F,F)-F | (2-18) | 5% |
| 3-HBBXB(F,F)-F | (2-23) | 3% |
| 3-HBB(F,F)XB(F,F)-F | (2-24) | 7% |
| 3-BB(F)B(F,F)XB(F,F)-F | (2-29) | 2% |
| 4-BB(F)B(F,F)XB(F,F)-F | (2-29) | 7% |
| 3-HH-V | (3-1) | 34% |
| 3-HH-V1 | (3-1) | 6% |
| V-HHB-1 | (3-5) | 13% |
| V2-HHB-1 | (3-5) | 13% |
| 1-BB(F)B-2V | (3-8) | 3% |
| 2-BB(F)B-2V | (3-8) | 4% |
| 3-BB(F)B-2V | (3-8) | 3% |

NI=99.4° C.; Tc<−40° C.; $\Delta n$=0.115; $\Delta \varepsilon$=4.3; Vth=2.20 V; $\eta$=11.2 mPa·s; $\gamma 1$=66.0 mPa·s.

To the above composition, compound (1) was added in a proportion of 1.3% by weight, and VHR-11 was measured.
VHR-11=64.3%

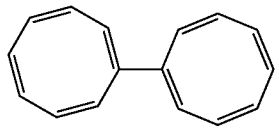

(1)

Example 28

| | | |
|---|---|---|
| 3-BB(F,F)XB(F,F)-F | (2-18) | 6% |
| 3-HBBXB(F,F)-F | (2-23) | 5% |
| 3-BB(F)B(F,F)XB(F,F)-F | (2-29) | 3% |
| 4-BB(F)B(F,F)XB(F,F)-F | (2-29) | 4.5% |
| 3-HHB-OCF3 | (2) | 5% |
| 3-HH-V | (3-1) | 34% |
| 3-HH-V1 | (3-1) | 3% |
| V-HHB-1 | (3-5) | 13% |
| V2-HHB-1 | (3-5) | 10% |
| 1-BB(F)B-2V | (3-8) | 3% |
| 2-BB(F)B-2V | (3-8) | 5% |
| 3-BB(F)B-2V | (3-8) | 5% |
| 2-BB(F)B-3 | (3-8) | 3.5% |

NI=100.0° C.; $\Delta n$=0.123; $\Delta \varepsilon$=3.5; Vth=2.48 V; $\eta$=11.7 mPa·s; $\gamma 1$=59.0 mPa·s.

To the above composition, compound (1) was added in a proportion of 1.0% by weight, and VHR-11 was measured.
VHR-11=61.8%

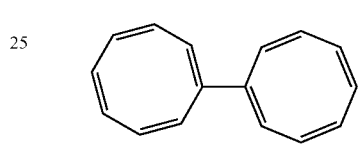

(1)

Example 29

| | | |
|---|---|---|
| 3-BB(F,F)XB(F,F)-F | (2-18) | 5% |
| 3-HBBXB(F,F)-F | (2-23) | 7% |
| 4-BB(F)B(F,F)XB(F,F)-F | (2-29) | 7% |
| 3-HH-V | (3-1) | 34% |
| 3-HH-V1 | (3-1) | 4% |
| 3-HB-O2 | (3-2) | 4% |
| V-HHB-1 | (3-5) | 14% |
| V2-HHB-1 | (3-5) | 13% |
| 3-HHB-O1 | (3-5) | 3% |
| 2-BB(F)B-2V | (3-8) | 5% |
| 2-BB(F)B-3 | (3-8) | 4% |

NI=98.9° C.; Tc<−40° C.; $\Delta n$=0.110; $\Delta \varepsilon$=3.0; Vth=2.53 V; $\eta$=12.1 mPa·s; $\gamma 1$=62.0 mPa·s.

To the above composition, compound (1) was added in a proportion of 1.3% by weight, and VHR-11 was measured.
VHR-11=65.1%

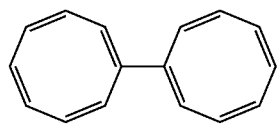

(1)

Example 30

| | | |
|---|---|---|
| 3-HHEB(F,F)-F | (2-3) | 2% |
| 3-HHXB(F,F)-F | (2-4) | 5.5% |
| 3-HBBXB(F,F)-F | (2-23) | 3% |

| | | |
|---|---|---|
| 3-HBB(F,F)XB(F,F)-F | (2-24) | 5% |
| 4-BB(F)B(F,F)XB(F,F)-F | (2-29) | 2% |
| 5-BB(F)B(F,F)XB(F,F)-F | (2-29) | 6% |
| 3-HH-V | (3-1) | 34% |
| 3-HH-V1 | (3-1) | 6% |
| 3-HH-VFF | (3-1) | 6% |
| V-HHB-1 | (3-5) | 12% |
| V2-HHB-1 | (3-5) | 13% |
| 2-BB(F)B-2V | (3-8) | 1.5% |
| 5-HBB(F)B-2 | (3-13) | 2% |
| 5-HBB(F)B-3 | (3-13) | 2% |

NI=104.3° C.; Δn=0.097; Δε=3.4; Vth=2.53 V; γ1=65.0 mPa·s.

To the above composition, compound (1) was added in a proportion of 1.0% by weight, and VHR-11 was measured.
VHR-11=62.6%

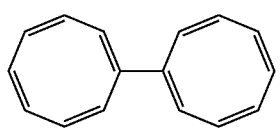
(1)

Example 31

| | | |
|---|---|---|
| 3-HHXB(F,F)-F | (2-4) | 4.5% |
| 3-GB(F)B(F)-F | (2-11) | 11% |
| 3-HBBXB(F,F)-F | (2-23) | 3% |
| 5-BB(F)B(F,F)XB(F,F)-F | (2-29) | 3% |
| 3-HH-V1 | (3-1) | 5% |
| 3-HH-VFF | (3-1) | 37% |
| V-HHB-1 | (3-5) | 12.5% |
| V2-HHB-1 | (3-5) | 13% |
| 3-HHB-1 | (3-5) | 2% |
| 3-HHB-3 | (3-5) | 2% |
| 3-HHB-O1 | (3-5) | 2% |
| 2-BB(F)B-2V | (3-8) | 3% |
| 5-HBB(F)B-2 | (3-13) | 2% |

NI=104.3° C.; Δn=0.097; Δε=3.4; Vth=2.54 V; γ1=68.0 mPa·s.

To the above composition, compound (1) was added in a proportion of 1.0% by weight, and VHR-11 was measured.
VHR-11=61.4%

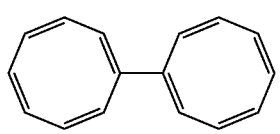
(1)

Example 32

| | | |
|---|---|---|
| 3-HBB(F,F)-F | (2-8) | 2% |
| 3-BB(F,F)XB(F,F)-F | (2-18) | 20% |
| 2-HBB-F | (2) | 6% |
| 3-HBB-F | (2) | 6% |
| 5-HBB-F | (2) | 6% |
| 3-HH-V | (3-1) | 32% |
| V-HHB-1 | (3-5) | 7% |
| 2-BB(F)B-3 | (3-8) | 9% |
| 2-BB(F)B-5 | (3-8) | 6% |
| 3-BB(F)B-5 | (3-8) | 6% |

NI=74.7° C.; Tc<−20° C.; Δn=0.130; Δε=4.4; Vth=2.09 V; η=16.0 mPa·s; γ1=54.0 mPa·s.

To the above composition, compound (1) was added in a proportion of 1.3% by weight, and VHR-11 was measured.
VHR-11=64.0%

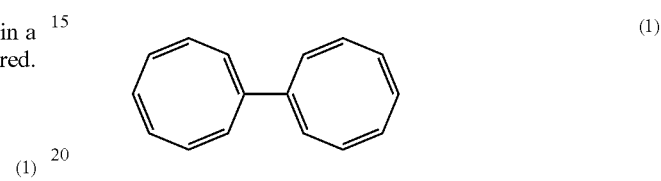
(1)

Example 33

| | | |
|---|---|---|
| 3-BB(F)B(F,F)-F | (2-15) | 11% |
| 3-BB(F,F)XB(F,F)-F | (2-18) | 10% |
| 3-BB(F)B(F,F)XB(F,F)-F | (2-29) | 3% |
| 4-BB(F)B(F,F)XB(F,F)-F | (2-29) | 7% |
| 3-HH-V | (3-1) | 41% |
| V-HHB-1 | (3-5) | 8% |
| 1-BB(F)B-2V | (3-8) | 6% |
| 2-BB(F)B-2V | (3-8) | 8% |
| 3-BB(F)B-2V | (3-8) | 6% |

NI=74.1° C.; Tc<−20° C.; Δn=0.135; Δε=6.0; Vth=1.93 V; η=15.5 mPa·s; γ1=45.0 mPa·s.

To the above composition, compound (1) was added in a proportion of 1.2% by weight, and VHR-11 was measured.
VHR-11=62.0%

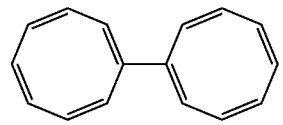
(1)

Example 34

| | | |
|---|---|---|
| 3-HHB(F,F)-F | (2-2) | 4% |
| 3-HBB(F,F)-F | (2-8) | 15% |
| 3-BB(F,F)XB(F,F)-F | (2-18) | 11% |
| 2-HHBB(F,F)-F | (2-19) | 5% |
| 3-HHBB(F,F)-F | (2-19) | 4% |
| 4-HHBB(F,F)-F | (2-19) | 4% |
| 2-HBB-F | (2) | 5% |
| 3-HBB-F | (2) | 5% |
| 3-HH-V | (3-1) | 40% |
| 3-HH-4 | (3-1) | 3% |
| 2-BB(F)B-3 | (3-8) | 4% |

NI=75.0° C.; Tc<−30° C.; Δn=0.100; Δε=5.1; Vth=1.70 V; η=15.6 mPa·s; γ1=52.0 mPa·s.

To the above composition, compound (1) was added in a proportion of 1.3% by weight, and VHR-11 was measured.

VHR-11=63.6%

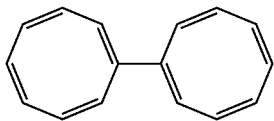
(1)

Example 35

| 3-HBB(F,F)-F | (2-8) | 2% |
| --- | --- | --- |
| 3-BB(F)B(F,F)-F | (2-15) | 13% |
| 3-BB(F,F)XB(F,F)-F | (2-18) | 19% |
| 2-HHBB(F,F)-F | (2-19) | 4% |
| 3-HHBB(F,F)-F | (2-19) | 5% |
| 4-HHBB(F,F)-F | (2-19) | 4% |
| 3-HBB(F,F)XB(F,F)-F | (2-24) | 5% |
| 3-HH-V | (3-1) | 32% |
| 3-HHB-1 | (3-5) | 3% |
| V-HHB-1 | (3-5) | 4% |
| 3-HBB-2 | (3-6) | 9% |

NI=80.3° C.; Tc<−30° C.; Δn=0.120; Δε=8.7; Vth=1.41 V; η=16.6 mPa·s; γ1=62.0 mPa·s.

To the above composition, compound (1) was added in a proportion of 1.3% by weight, and VHR-11 was measured.
VHR-11=61.4%

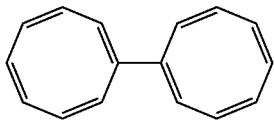
(1)

The voltage holding ratio (VHR-11) of the composition in Comparative Example 1 after irradiation with ultraviolet light was 38.0%. On the other hand, VHR-11 of the composition in Example 1 was 61.4%. Thus, the composition in Example 1 was found to have a large VHR-11 in comparison with the composition in Comparative Example 1. Accordingly, the liquid crystal composition of the invention is concluded to have superb characteristics.

INDUSTRIAL APPLICABILITY

A liquid crystal composition of the invention can be used in a liquid crystal monitor, a liquid crystal television and so forth.

What is claimed is:

1. A liquid crystal composition that contains a compound represented by formula (1) as an additive, at least one compound represented by formula (2) as a first component, and has a nematic phase and positive dielectric anisotropy:

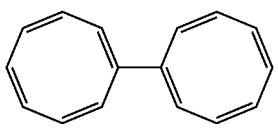
(1)

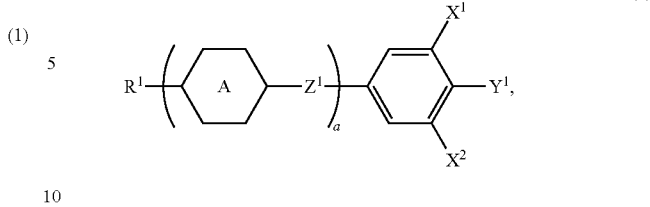
(2)

wherein, in formula (2), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; and a is 1, 2, 3 or 4.

2. The liquid crystal composition according to claim 1, wherein a proportion of the additive is in the range from 0.005% by weight to 2% by weight.

3. The liquid crystal composition according to claim 1, containing at least one compound selected from the group of compounds represented by formula (2-1) to formula (2-35) as the first component:

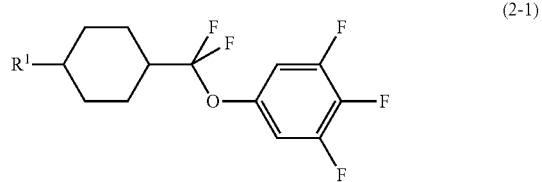
(2-1)

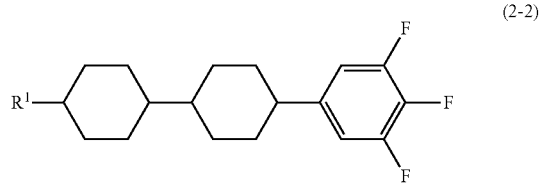
(2-2)

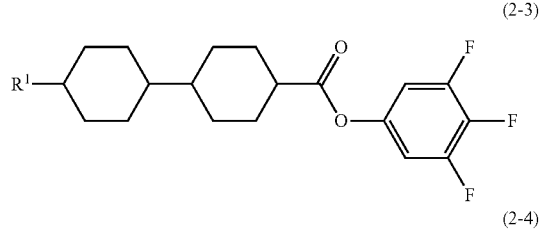
(2-3)

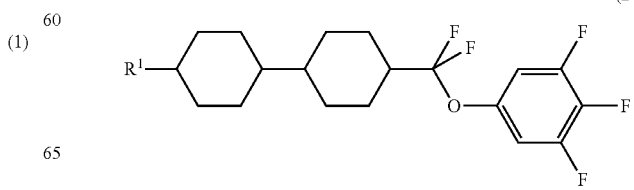
(2-4)

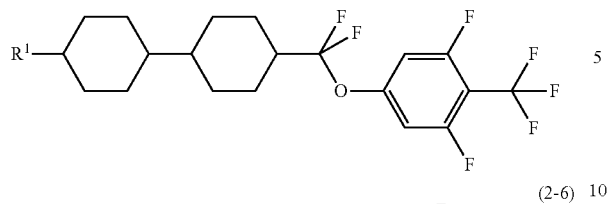
(2-5)
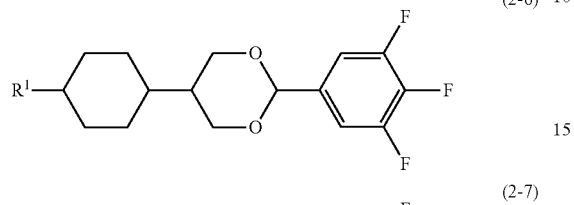
(2-6)
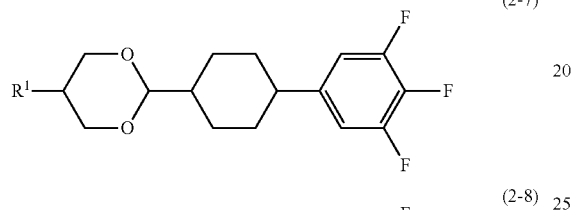
(2-7)
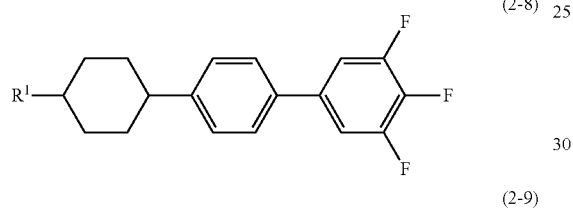
(2-8)
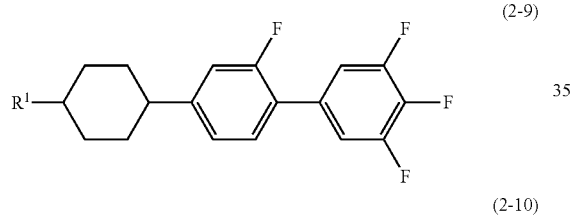
(2-9)
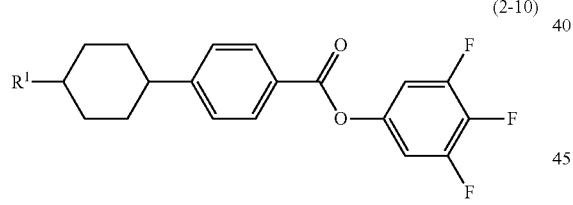
(2-10)
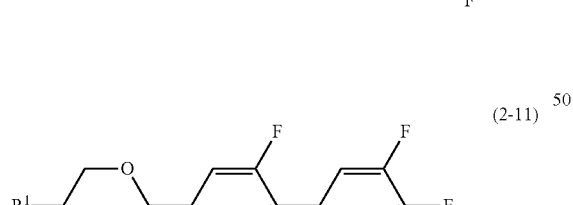
(2-11)
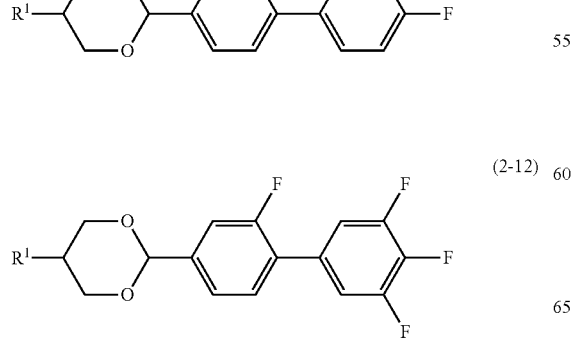
(2-12)
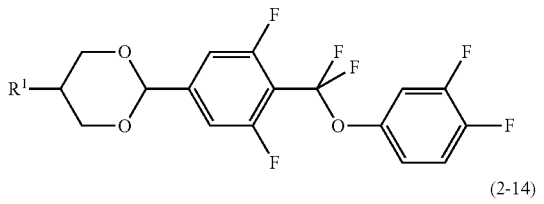
(2-13)
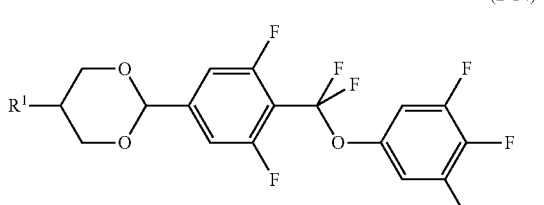
(2-14)
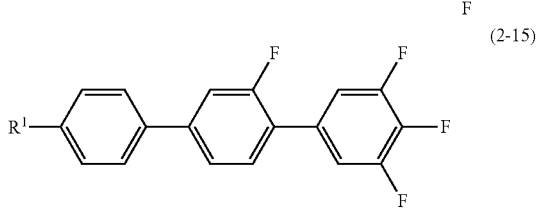
(2-15)
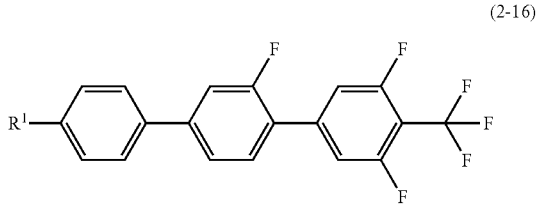
(2-16)
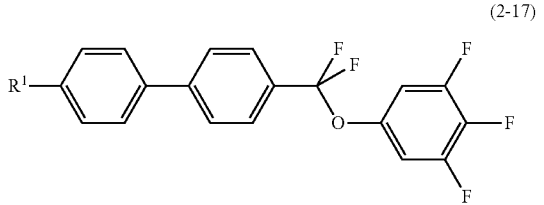
(2-17)
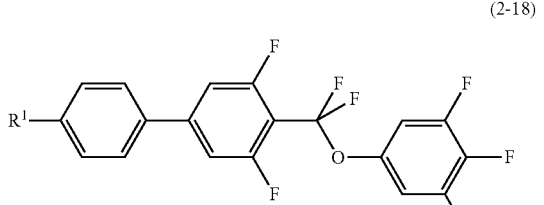
(2-18)
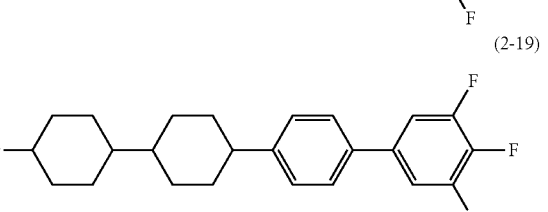
(2-19)
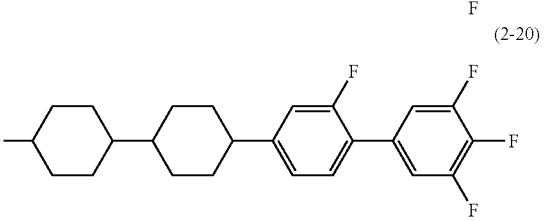
(2-20)

(2-21)
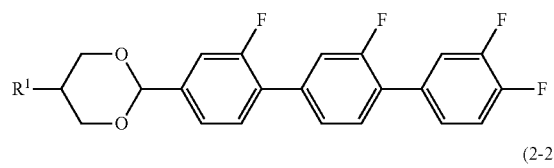
(2-22)
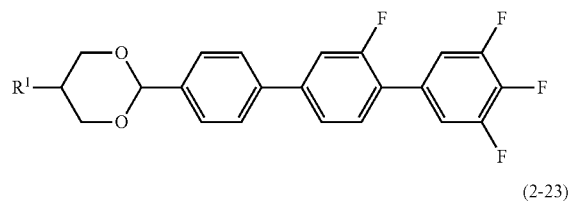
(2-23)
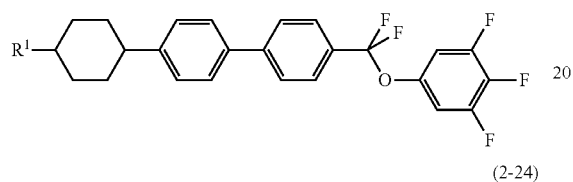
(2-24)
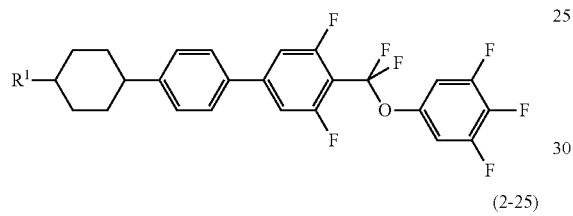
(2-25)
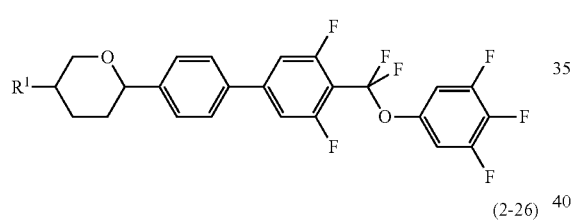
(2-26)
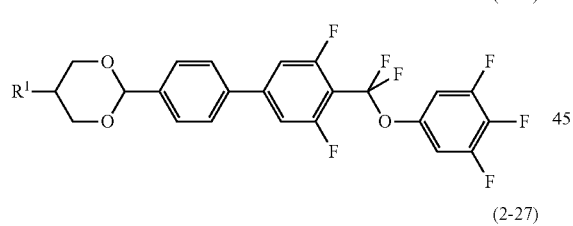
(2-27)
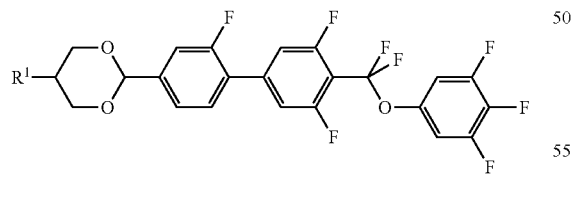
(2-28)
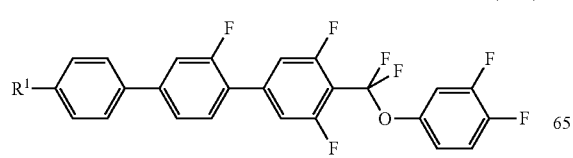
(2-29)
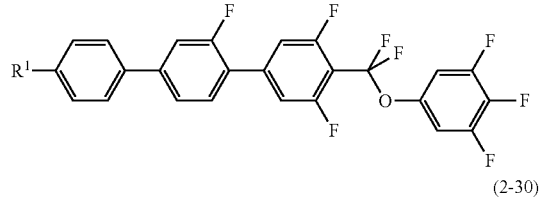
(2-30)
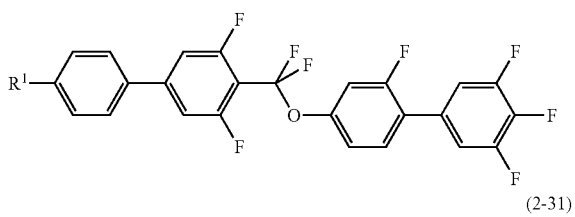
(2-31)
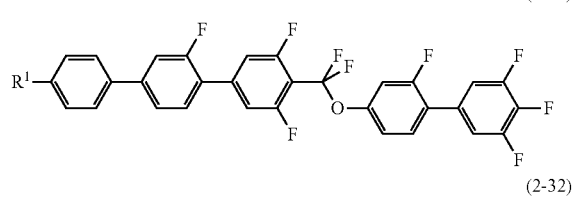
(2-32)
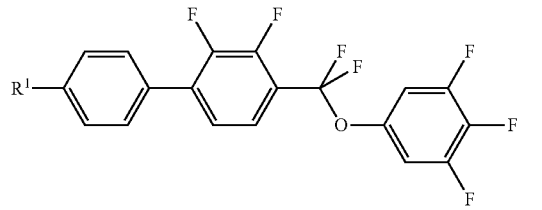
(2-33)
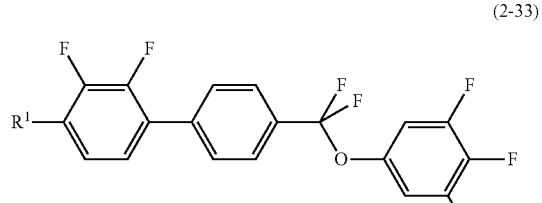
(2-34)
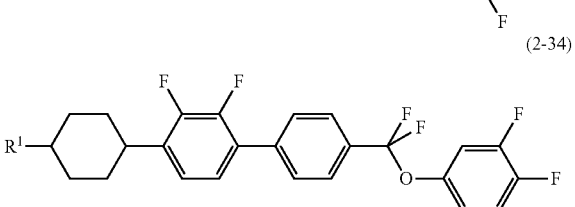
(2-35)
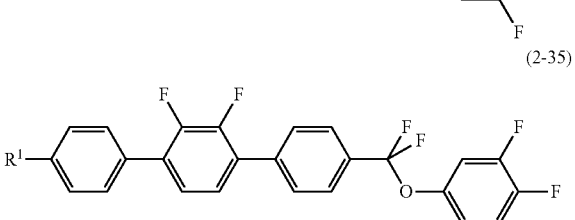
wherein, in formula (2-1) to formula (2-35), $R^1$ is alkyl having 1 to 12 carbons, alkoxy having 1 to 12 carbons or alkenyl having 2 to 12 carbons.
4. The liquid crystal composition according to claim 1, wherein a proportion of the first component is in the range from 10% by weight to 85% by weight.

5. The liquid crystal composition according to claim 1, containing at least one compound represented by formula (3) as a second component:

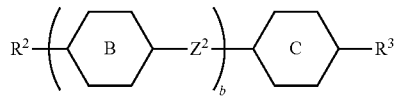
(3)

wherein, in formula (3), $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

6. The liquid crystal composition according to claim 5, containing at least one compound selected from the group of compounds represented by formula (3-1) to formula (3-13) as the second component:

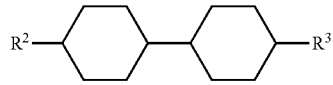
(3-1)

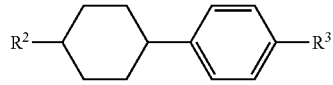
(3-2)

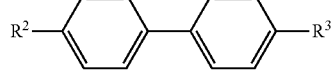
(3-3)

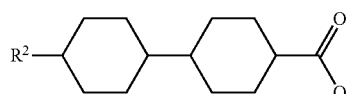
(3-4)

(3-5)

(3-6)

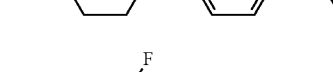
(3-7)

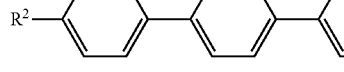
(3-8)

-continued

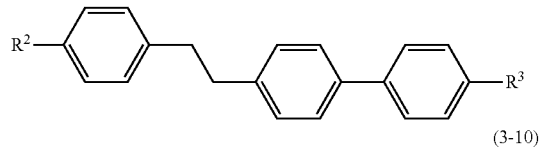
(3-9)

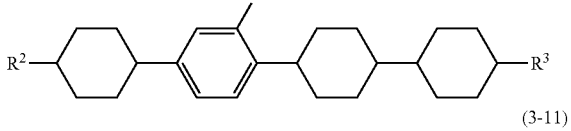
(3-10)

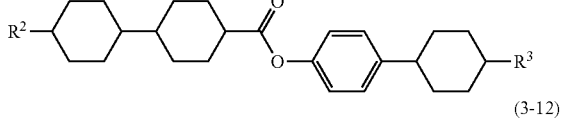
(3-11)

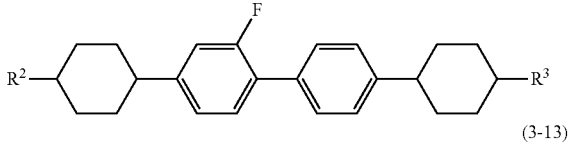
(3-12)

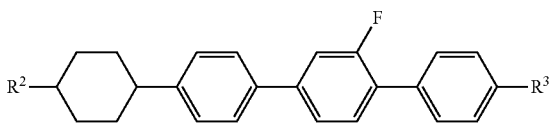
(3-13)

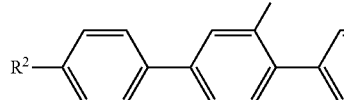

wherein, in formula (3-1) to formula (3-13), $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine.

7. The liquid crystal composition according to claim 5, wherein a proportion of the second component is in the range from 10% by weight to 85% by weight.

8. The liquid crystal composition according to claim 1, containing at least one compound represented by formula (4) as a third component:

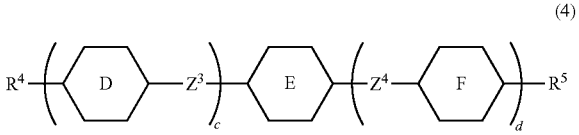
(4)

wherein, in formula (4), $R^4$ and $R^5$ are independently, alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.
9. The liquid crystal composition according to claim 8, containing at least one compound selected from the group of compounds represented by formula (4-1) to formula (4-22) as the third component:
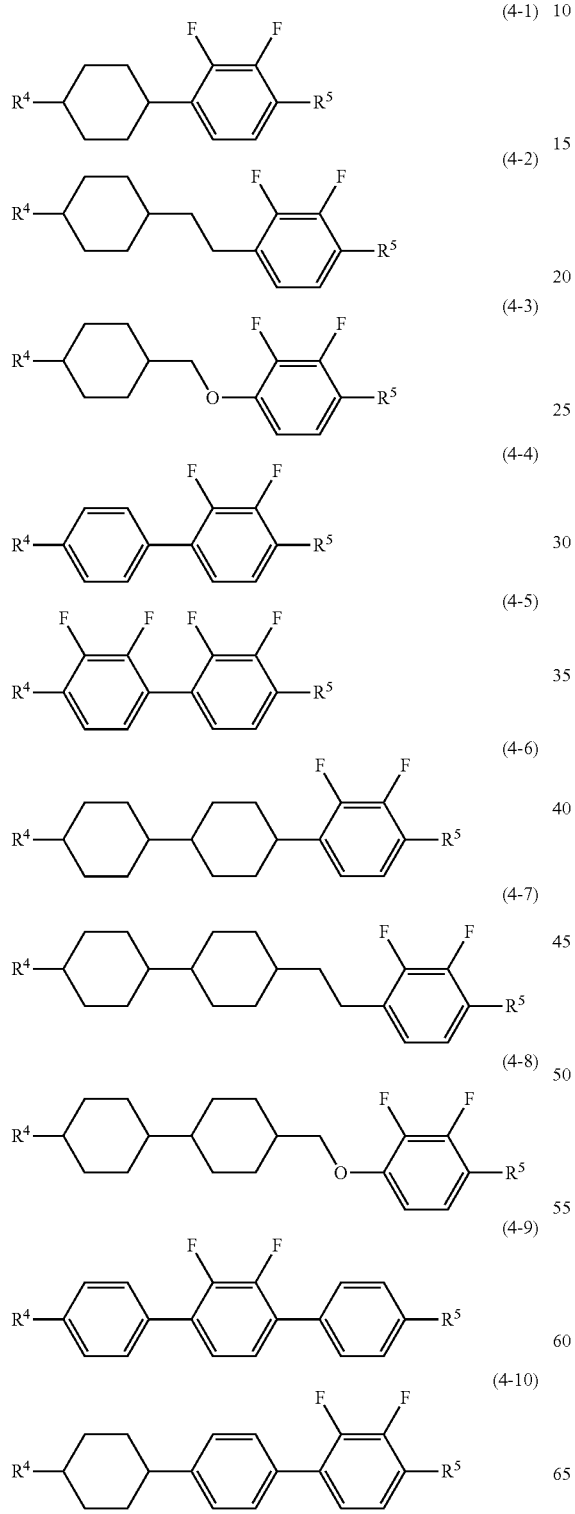
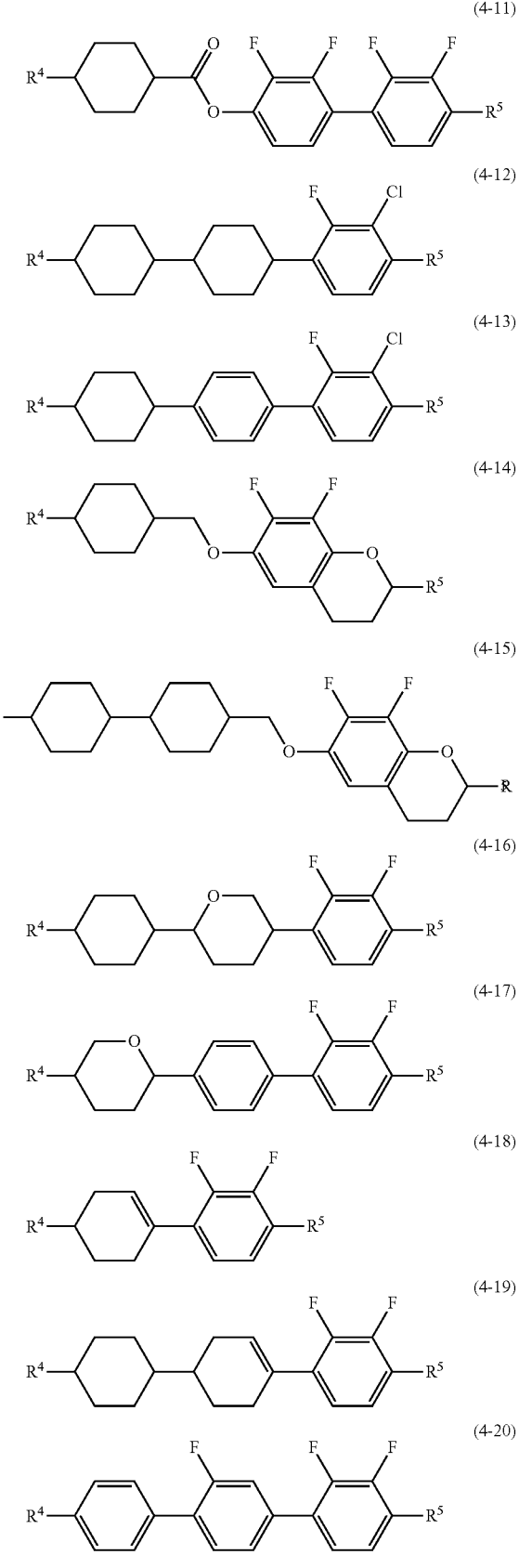

(4-21)

(4-22)

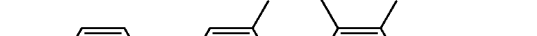

wherein, in formula (4-1) to formula (4-22), $R^4$ and $R^5$ are independently alkyl having 1 to 12 carbons, alkoxy having 1 to 12 carbons, alkenyl having 2 to 12 carbons or alkenyloxy having 2 to 12 carbons.

10. The liquid crystal composition according to claim 8, wherein a proportion of the third component is in the range from 3% by weight to 25% by weight.

11. The liquid crystal composition according to claim 5, containing at least one compound represented by formula (4) as a third component:

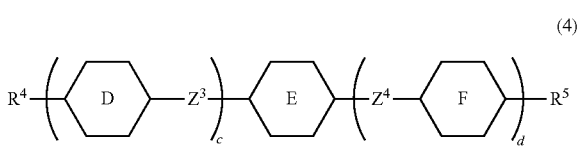

(4)

wherein, in formula (4), $R^4$ and $R^5$ are independently, alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, tetrahydropyran-2,5-diyl, 1,4-phenylene, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

12. The liquid crystal composition according to claim 1, wherein a maximum temperature of a nematic phase is 70° C. or higher, an optical anisotropy measured at 25° C. at a wavelength of 589 nanometers is 0.07 or more, and a dielectric anisotropy measured at 25° C. at a frequency of 1 kHz is 2 or more.

13. A liquid crystal display device including the liquid crystal composition according to claim 1.

14. The liquid crystal display device according to claim 13, wherein an operating mode in the liquid crystal display device is a TN mode, an ECB mode, an OCB mode, an IPS mode, an FFS mode or an FPA mode, and a driving mode in the liquid crystal display device is an active matrix mode.

* * * * *